US006086694A

United States Patent [19]

Winter et al.

[11] Patent Number: 6,086,694

[45] Date of Patent: Jul. 11, 2000

[54] HIGH SPEED WEB MACHINE

[75] Inventors: Steven Winter, Highland Park; Jerry Shallow, Wood Dale, both of Ill.

[73] Assignee: Stanley Lerner, Glencoe, Ill.

[21] Appl. No.: 08/829,854

[22] Filed: Apr. 1, 1997

[51] Int. Cl.[7] .............................. B32B 7/12; B32B 31/00

[52] U.S. Cl. .......................... 156/64; 118/669; 156/353; 156/355; 156/356; 156/362; 156/363; 156/519; 156/520; 156/521; 156/522

[58] Field of Search .................................... 156/362, 363, 156/519, 520, 64, 353, 355, 356, 521, 522; 118/669

[56] References Cited

U.S. PATENT DOCUMENTS

| | | | |
|---|---|---|---|
| 3,244,863 | 4/1966 | Paterson | 235/151.11 |
| 3,774,016 | 11/1973 | Sterns et al. | 235/151.1 |
| 4,061,521 | 12/1977 | Lerner et al. | 156/521 |
| 4,230,521 | 10/1980 | Cobb et al. | 156/549 |
| 4,264,957 | 4/1981 | Pautzke | 364/469 |
| 4,316,566 | 2/1982 | Arleth et al. | 226/2 |
| 4,318,176 | 3/1982 | Stratton et al. | 364/469 |
| 4,322,802 | 3/1982 | Lewis, Jr. et al. | 364/470 |
| 4,415,978 | 11/1983 | Craemer et al. | 364/475 |
| 4,426,898 | 1/1984 | Friberg | 83/37 |
| 4,502,910 | 3/1985 | Voltmer et al. | 156/361 |
| 4,528,630 | 7/1985 | Sargent | 364/469 |
| 4,618,391 | 10/1986 | Torti et al. | 156/353 |
| 4,759,247 | 7/1988 | Bell et al. | 83/346 |
| 4,888,717 | 12/1989 | Ditto et al. | 156/361 |
| 4,955,265 | 9/1990 | Nakagawa et al. | 83/74 |
| 4,997,509 | 3/1991 | Fujii | 156/364 |
| 5,072,831 | 12/1991 | Parrotta et al. | 206/232 |
| 5,193,727 | 3/1993 | Crowley | 226/24 |
| 5,235,515 | 8/1993 | Ungpiyakul et al. | 156/521 |
| 5,242,521 | 9/1993 | Hibsch et al. | 156/200 |
| 5,344,057 | 9/1994 | Crowley | 226/2 |
| 5,370,024 | 12/1994 | Lerner et al. | 83/154 |
| 5,443,679 | 8/1995 | Nishimura et al. | 156/361 |
| 5,470,429 | 11/1995 | Shinomiya et al. | 156/522 |
| 5,478,422 | 12/1995 | Bright et al. | 156/64 |
| 5,503,702 | 4/1996 | Filicicchia et al. | 156/249 |
| 5,538,171 | 7/1996 | Crowley | 226/2 |
| 5,584,932 | 12/1996 | Clark et al. | 118/669 |
| 5,674,334 | 10/1997 | Instance | 156/64 |
| 5,766,406 | 6/1998 | Bohn et al. | 156/362 |

OTHER PUBLICATIONS

"M–Rotary Manual" by Fenner Controls, a Division of Contrex Inc. (1993), approximately 140 pages, no month.

"M–Trim Manual" by Fenner Industrial Controls, (1991), approximately 160 pages, no month.

*Primary Examiner*—Deborah Jones
*Assistant Examiner*—Robert R. Koehler
*Attorney, Agent, or Firm*—Fitch, Even, Tabin & Flannery

[57] ABSTRACT

A method and apparatus are provided for applying swatches to a continuously traveling web, which is usually preprinted, and which is severed into sheets of a predetermined repeat length. When going from one size of repeat length to another size of repeat length, swatch-applying cylinders are profiled to match the cylinder velocity to the web velocity during a swatch application over a first portion of a revolution of the swatch cylinder and then the rotational velocity is changed substantially during a sync recovery portion of the cylinder's revolution. Preferably, the adhesive, which is applied to the web to adhere the swatches, is by an adhesive cylinder which is similarly provided with a matching velocity portion of a revolution and a sync recovery portion at a different velocity. The cutting operation is preferably by a knife cylinder which is also similarly profiled. Registration of the swatch to the web is achieved by sensing registration marks on the web and then by phasing the cylinders by shifting their angular position of the cylinder and the swatches thereon so that they are precisely placed on the web. In the preferred embodiment, color cards are made with many rows of color chip swatches with each row being applied at each of a long line of swatch-applying stations, e.g., up to 16 stations and rows.

33 Claims, 15 Drawing Sheets

HIGH SPEED WEB MACHINE

BACKGROUND OF THE INVENTION

This invention relates to a method of and apparatus for manufacturing sheets having swatches thereon.

The present invention is an improvement over the method and apparatus for the manufacture of sheets having swatches thereon disclosed in U.S. Pat. No. 4,061,521, in which sheets are moved intermittently through a machine to receive rows of swatches thereon. In this patented method, the sheets are conveyed to a register stop at each station where the sheets are registered while swatches are being applied thereto from a rotating swatch-applying cylinder. Although this patented method has been very successful and is a great improvement over the older till box and vacuum transfer system, the patented method still has a number of shortcomings, as will now be discussed.

Various attempts have been made to substantially increase the production speed of this intermittent sheet feed system by trying to control the sheet as it is being conveyed. A slight shifting of the adhesive bearing sheet results in a misregistration of the swatches with preprinted material on the sheet. It is also desired to prevent the sheet from becoming jammed or cocked and not fed properly from one swatch-applying station to the next swatch-applying station; often there are as many as ten or more swatch-bearing stations in a row. The sheets traveling downstream from the first swatch-applying station will have rows of swatches and rows of wet adhesive thereon, all of which make the sheet more difficult to control at higher speeds of travel than are dry sheets without having been converted by the application of one or more rows of swatches applied to the sheet.

The registration of the swatches on the sheets needs to be precise in that the swatches, such as color chips, are often placed adjacent a preprinted description for the color of the adjacent chip. The chip should not overlie or be so close to the printing that the desired appearance for the color sheet or card is disturbed. In some instances, the color chip must be inserted into a preprinted box; and if the chip is out of register only a few thousandths of an inch, the chip may cover one side of the printed box.

When manufacturing color chip sheets, the same machine is often used for various sizes of sheets or chips, for example, from 8 to 23 inches in the longitudinal feed direction of the sheet. The same machines usually are required to apply swatches to paper that is about 0.0035 to 0.004 inch thick, as well as to paperboard that is about 0.008 to 0.010 inch thick. Also, the swatches vary in area, thickness, swatch material, and the pattern of deposition on a sheet.

It is a particular problem from a loss of production and from a time standpoint to change from one job to another job with a change of adhesive and swatch patterns, as well as a change in sheet size in the machines described in the aforementioned patent. The adhesive and swatch-applying cylinders have a fixed circumferential length associated with a particular size of sheet. In some instances where the sheet length is short, the cylinder circumference may be double the sheet length; so that a set of swatches may be applied during each half of a revolution of the swatch-applying cylinder. Of course, many sheets do not have a dimension in the travel direction that is an even number multiple of the cylinder circumference, so that adhesive and swatch-applying cylinders must be replaced with new cylinders having a circumference appropriate for the new sheet length. When there are ten or more cylinders, including adhesive cylinders to be replaced, the job is very time-consuming. Also, the cylinders typically weigh several hundred pounds each and require cranes to lift and transport them. With a change in cylinders, there is also a necessity to change gears and to reset timing cams to properly time the severing of chips from ribbons of chip material and the application of chips in proper register to the printed matter. Also, gear and other changes are needed for the conveying mechanism to stop the pushing of the sheets for proper registration with the cylinders.

The set-up time from running one job for one size of sheet to another job, using another size of sheet and involving the change of cylinders and other attendant changes discussed above, may take another eight hours; and it may take another eight hours or more to finely tune the machine so that it is properly running at high production speed. As the speed of operation is increased during a fine tuning operation, problems arise that were not detected at lower speed operations, and the solution to these problems usually requires a stopping of the machine while adjustments are made. Because the adhesive is wet on the sheets, those sheets in the machine having wet adhesive spots must be removed and scrapped where the adjustment has taken so long that the adhesive becomes dry or substantially dry. This results in sheet spoilage, which becomes very significant if it is taking eight to sixteen hours or more and the running of the machine with sheets during set-up and the fine tuning operations.

Not only is there a significant amount of spoilage during the set-up and fine tuning to a production speed operation of the machine but also during the actual high speed production runs spoilage occurs all too frequently as sheets become jammed. One common source of sheet jamming is the sheet-by-sheet feeder required to place individual sheets from a stock into the swatch placement process. When jamming occurs, the machine is stopped and the jammed sheet and often the sheets that have received adhesive and are downstream of the adhesive station have to be removed from the machine and scrapped. Because the sheets receive wet adhesive and travel at high speeds, sheet jamming occurs with sufficient frequency that both spoilage and lost production time become significant cost factors with this patented system.

From the foregoing, it will be seen that there is a need for a new and improved method of manufacture of swatch-bearing sheets. Preferably, the production speed will be increased several times above the current production speed. Also, the make-ready time and time for fine tuning need to be reduced very substantially from the eight to sixteen hours now used. Further, the sources of sheet jamming need to be reduced and the significantly high scrap rate, e.g., of ten percent or greater, needs to be reduced significantly to one-half or less than current scrap rates.

SUMMARY OF THE INVENTION

In accordance with the present invention, there is provided a new and improved method and apparatus for the manufacture of swatches applying them to a web, which is usually preprinted, and which is cut into sheets after all of the swatches have been applied to the sheet being cut. The use of a web results in significantly faster production speeds and less scrap or spoilage during production.

In the preferred method and apparatus, the cylinders are not changed when going from one size of severed sheet to another size of severed sheet, with the consequence that the down time and lost production are several times less than with the above-described, patented sheet machine where the cylinders were changed. Concomitantly, for this web machine, the scrap or production of materials during set-up and initial production run tweaking is very small as compared to a conventional sheet machine. The reduction in scrap during set-up and during an actual production run of a job, allows the running of a job with considerably less chip and sheet material, thereby resulting in less material cost for the job. Of course, the faster production speed for the web machine of the present invention also provides a significant reduction in labor cost for a given job from the cost of doing the same job on a conventional sheet machine.

In accordance with the present invention, precise registration of swatches to printed material on a traveling web is achieved by the use of registration marks on the web; and the detection of the registration mark and the phasing of the cylinders by shifting the angular position of the cylinder and the swatches on the cylinder so that the swatches are applied and are precisely positioned relative to the reference mark and the printed material on the web. It will be appreciated that registration using marks on the web is most useful when considering the factors that may cause misregistration. A preprinted web, when unwound and fed at high speed through a large number of swatch-applying stations, is stretched and the amount of stretching is affected by ambient moisture and temperature conditions. The amount of wet adhesive applied and its location can also affect the web and the stretch in the web. As the web travels through many stations and receives many rows of swatches, it may stretch further and cause a misregistration of the latter rows of swatch applications. Other factors that may affect the registration, from one job to the next job, are: the webs are of various different materials; the webs are reprinted at different times and wound at different tensions by different printers; and the web may vary greatly in the amount of preprinted material on the web. To offset these factors that may cause misregistration of swatches in the preferred machine, one or more sensors, preferably optical sensors, detect a registration mark on the printed web and adjust the phase of an associated cylinder into registering with the mark and the printed material on the traveling web. In the illustrated embodiment of the present invention, there is a sensor associated with an adhesive-applying cylinder, each swatch cylinder, and a knife cut-off cylinder that severs the web into sheets. Thus, each of these cylinders at each of these stations is phase shifted to register precisely. Despite the use of the above-described sensors, there may be occasions where the desired registration is still not being achieved during set-up or during the course of a production; and in such event, the operator may desire to make a correction. In such an event, the operator may use a manually-operated, fine tuning control to advance or retard the phase of the cylinder relative to the web to obtain the desired registration of the swatches to the preprinted material on the web.

In accordance with the present invention, it is preferred to have the cylinders of a predetermined circumference and to profile the cylinders to match the velocity at the time of the cylinders' operation on the web. That is, the circumference of the cylinder varies significantly from the repeat distance of the sheet's size in the web feed direction and the cylinder's velocity is matched to web speed for an operation on the web, and the web speed is changed substantially during the remainder of the revolution. For example, the cylinder's velocity is matched to the web travel velocity for the time of application of a row of swatches during a speed match of the cylinder, and then the cylinder's velocity is increased very substantially during the remainder of the revolution so that the next row of swatches will be precisely positioned. In the embodiment of the invention described in detail in this application, the cylinder's circumference is about eighteen inches; and the sheet's dimension or repeat preprinted pattern is about every eight and one-half inches so that there is about nine inches of circumference which must be rotated at a much higher velocity during the remainder or sync recovery portion of the cylinder's revolution. Thus, the cylinder's circumference is not equal to the sheet size or the repeat pattern size (or an even multiple thereof) as in a typical printing operation. Preferably, the adhesive cylinder is also profiled, as is a knife cylinder that has a knife blade to sever the web into the sheets.

When changing from one size of a sheet to be cut from a web, the cylinder is not changed but the profiling is changed electronically, and the phasing may also be changed electronically such that the cylinder starts its web matching speed at a different point on its circumference and extends for a different segment of the cylinder's circumference. The circumference of the cylinder is divided into increments of 0.001 inch or smaller; and the starting point of web matching speed is at a given rotational address or point which point can be stored electronically in a memory, or which can be switched electronically to a different point about the circumference for a different sheet length. Likewise, the point of termination of the web matching portion of the revolution stops after a predetermined count from the starting point; and then the cylinder is accelerated to its maximum speed for recovery of the remaining cylinder portion until the point of deceleration to reach the web velocity at the starting point for the next revolution. All of these various location points and cylinder velocities for a given job may be stored as data in a computer memory. At the completion of a job, the stored data may be moved to a permanent storage medium such as a hard drive or floppy disk. The next time the same job is to be run, the computer may use the stored data from the permanent storage to set the points and velocities for each of the cylinders. Likewise, the computer will have stored the web velocity and the web tension and other variables so that substantially all of the previous variables obtained from the prior job, after its set-up and fine tuning, are immediately available and used in the initial set-up of the job when it is being run again. As will be explained, only single gear for the swatch ribbon drive needs to be changed in the apparatus described herein when changing from job to job as contrasted to the change of each cylinder, adjustment of cams, and multiple gear mechanism changes in the sheet machine.

DETAILED DESCRIPTION OF THE PREFERRED EMBODIMENTS

Figure 1A:
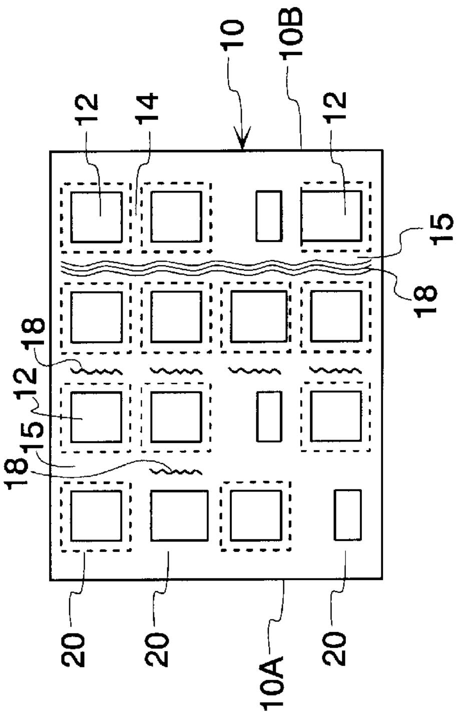
FIG. 1A is a plan view of a swatch bearing sheet bearing rows of swatches and printed matter.

As shown in the drawings for purposes of illustration, the invention is embodied in a method and apparatus for making chip or swatch-bearing sheets 10, such as color cards, which comprise a base sheet or card 10 bearing an array of individually colored chips or swatches 12 (FIG. 1A) of various sizes. The swatches are laterally separated from each other by spaces 14 in a row in a transverse direction across the sheet, and these rows are longitudinally spaced from one another by longitudinal spaces 15 on the card. As will be explained in greater detail, the swatches are applied to a continuous web 16 upstream of a severing station 31, shown in FIG. 1, where the web is severed into individual, discrete sheets. The number of swatches in a given row may vary substantially from row to row, and the transverse width of each swatch may vary within a row. Also, the length of the swatches in the longitudinal direction may be varied from row to row. Usually, the sheet is preprinted with printed matter 18 that includes an identification of the color or the like for each swatch applied to the card. The swatches should be applied very closely adjacent to and aligned, usually parallel, with the printed matter 18. Often, a printed box 20 or the like is preprinted on the sheet and it is desired to position the swatch precisely within the box without covering one side of the box.

Each of the swatches 12 is adhered to the sheets 10 by spots 22 (FIG. 4) of glue or adhesive which herein are applied to the sheets 10 at an adhesive or glue applying station 24 where an adhesive means, such as adhesive-applying cylinder 26, rotates and applies the spots of adhesive to the web 16 precisely relative to the printed matter 18 and 20. After the adhesive spots have been applied, the swatches are pressed onto these adhesive spots to adhere to the underlying web. Preferably, there are a plurality of swatch-applying stations 30, such as six to fourteen swatch-applying stations 30 shown in FIG. 1, each of which applies a row of swatches to the sheet. Although the described embodiment includes a single adhesive applying station 24, other embodiments may include multiple adhesive applying stations interspersed with the swatch applying stations.

As disclosed in the above-identified U.S. Pat. No. 4,061,521, heretofore these swatch-bearing sheets were made using preprinted, discrete sheets that were fed by a sheet feeder to the adhesive-applying station and to the series of swatch-applying stations. The sheets were fed by conveyor chains that had pushers that pushed the trailing end of each sheet. All of the sheets stopped at each station to register, and then they were fed at a speed to match the circumferential velocity of the adhesive-applying and swatch-applying cylinders. The speed of the operation was limited due to the difficulty of keeping the sheets precisely registered particularly when they had wet glue spots thereon and a first row or two of swatches thereon. The cylinders had circumferential dimension that was matched to the sheet length or in some instances, the swatch-applying cylinder had a length double the sheet length so that a row of swatches could be applied to each half of a cylinder revolution. The sheet length and cylinder periphery were thus matched to or an even multiple of the sheet length. However, these machines are usually required to run a number of different sheet lengths and a separate set of cylinders were inventoried for each of the various sheet lengths. To change from one sheet length to another sheet length, the heavy cylinders had to be exchanged, and gears had to be changed so as to match the linear travel speed of the new sheet to the circumferential rotational velocity of the new cylinders. The make-ready for a new high speed run with these sheet machines could take eight (8) hours and the fine tuning to reach a sustainable production at a high speed production could take as such as another eight hours. In addition to a change in sheet size from about 8 to 23 inches, there often is a change in sheet thickness from paper at about 0.0035 inch to paper board at 0.008 to 0.010 inch thick. During the make-ready and fine tuning operations, a large amount of scrap was generated; and during production, if a sheet became jammed, the machine often had to shut down and the sheets in the machine had to be scrapped.

In accordance with the present invention, the swatch-bearing sheets 10 are severed from the continuous, preprinted web 16 (FIG. 1) which is fed through a series of swatch-applying stations generally designated 30 (there are six stations 30A–F, shown in FIG. 1) at a substantially constant linear speed where swatches 12 are applied to the web and adhered thereto by swatch cylinders 32, which are revolution profiled to match the repeat length of the sheets 10 between opposite ends 10*a* and 10*b* thereof. The web 16 is coiled in a roll 28, is unwound and travels through various swatch-applying stations 30, and then is severed by at a severing station 31 by a knife 33 on a cutting cylinder 35. The revolution profile of these respective cylinders is achieved by the use of variable speed motors, generally indicated by the reference character, 34 (FIG. 1) for rotating the cylinders to have a speed match portion 44 (FIG. 4A) of a revolution of the cylinder, where the speed of the cylinder and the web have the same velocity as during the applying of swatches to the web, and then a change in velocity during a sync recovery portion 48 of the cylinder's revolution. The sync recovery portion is the different speed portion of the cylinder's revolution at a faster or slower speed than the match speed. Because the circumference of the cylinder, e.g., eighteen (18) inches, varies substantially from the sheet's dimension or repeat printed pattern, e.g., 8½ inches, there must be about nine inches where the circumference must be rotated at a higher sync recovery velocity. In this illustrated example, the sheet length in the longitudinal direction is only 8½ inches; and a row of swatches is to be applied to the web once every revolution during less than 8½ inches of a speed match portion 44 (FIGS. 4A, 4B, 6 and 7) of the cylinder's revolution.

In order that the next repeat length of sheet of the web also receives the speed match portion of the next revolution, the cylinder's velocity is accelerated and rotates at a much faster velocity over about 9½ inches of the cylinder's revolution during the sync recovery portion 48 (FIGS. 4A, 4B, 6 and 7) of the cylinder's revolution. Thus, the cylinder's circumference is not equal to a sheet length or to a repeat print pattern size, as would be the case in a typical printing operation. In color swatch applications, the repeat length or sheet size may vary from about 8" to 23" by way of example. As will be explained, the profiling of the cylinder can be done electronically from a controller 36 (FIG. 2) when changing repeat lengths for new jobs without changing cylinders, as in the conventional machines.

The profiling of the swatch cylinder 32 also involves the phasing of the swatch cylinder 32 so that the cylinder starts its web match speed at a different starting point 40 (FIG. 6) about its circumference and extends for a different segment of the cylinder's circumference. Herein, the cylinder's circumference is divided into increments of 0.001 inch or less, and the starting point 40 (FIG. 6) of the speed match portion 44 of the cylinder's revolution is given a rotational address which can be stored electronically in a memory in the controller 36. The starting point address for the speed match portion can be switched electronically about the cylinder for a different sheet length or repeat pattern. Likewise, an end match point 42 (FIG. 6) of termination of the speed match portion 44 of the cylinder's revolution is given an address or is located after a predetermined count; and then the cylinder is accelerated or decelerated (as shown by line 46 in FIG. 6) to its sync recovery velocity portion 48 for a given count or to an address 49 over which deceleration 49 (or acceleration) is needed to shift back to the speed match velocity. All of these various starting points, end match points, sync points, etc. can be stored electronically in the memory for a given job as well as storing electronically in memory the speed match velocity and the sync recovery velocity. The amount of set-up and fine tuning can be drastically reduced over the conventional sheet machine when running the same job again, and immediately going to these stored points and velocities. Some small fine tuning changes may be needed because of different ambient conditions or differences in the rolled, preprinted web from one job to the next job.

In accordance with the preferred embodiment of the invention, the adhesive-applying cylinder 26 at the adhesive-applying station 24, and the knife cylinder 33 at the sheet-severing station 31 are also profiled in the manner of the swatch-applying station 30, as above-described in connection with in FIGS. 4A, 4B, 6 and 7. That is, the adhesive spots 22 are applied at exact positions relative to the printed matter or relative to the sheet ends 10*a* and 10*b* because the adhesive spots are usually the same size as the swatch to be adhered thereto so that excessive adhesive does not extend beyond the edges of the swatches. Conversely, the adhesive spots should not be so small that the edges of the swatches are not adhered to the sheet. Likewise, at the severing station 31 (FIG. 9), the rotational velocity and the cutting position of the severing blade 33 are profiled to cut precisely the sheet from the web with the blade's velocity being substantially matched to the web's velocity at the time of cutting. If the blade's velocity varies substantially from the web's velocity at the time of severing, the sheet can be torn and not precisely severed from the web with a clean, sharp cut edge.

To offset the various factors that may cause misregistration of the swatches 12 on the finally cut sheet 10, one or more web sensors, generally designated by the reference character 50, are used to sense a reference or mark 52 (FIG. 3) on the web; and the cylinder's speed match portion 44 may be phased by shifting the starting point 40 and ending point 42 of the speed match portion 44 of the revolution so that the swatches are precisely positioned on the web. Herein, it is preferred to have a web sensor 50 associated with each adhesive cylinder 26, swatch cylinder 32, and the cut-off cylinder 35 and to phase shift each of these cylinders if the reference mark is sensed at a position out of phase with the respective cylinder being controlled by its associated web sensor. As will be explained in greater detail, each web sensor 50 (FIG. 2) looks for the reference mark, which is preferably a preprinted mark on the edge of the web that will be eventually severed. On the other hand, the reference mark 52 could be a portion of a printed pattern on the web 16 which is never severed from the web.

The preferred sensor is an optical sensor that senses the reference marks and sends a signal over line 54 which is connected to and controls associated controls 56–59, which is connected to an associated servo, variable speed motors 34A–34I (FIGS. 1 and 2) for the associated cylinder. A drum position sensor, generally designated by the reference character 60, reads the position of its associated cylinder and sends this position over line 62 to the associated controller. At the time that reference mark 52 is sensed by the web sensor, the associated controller compares the cylinder's position received from the drum position sensor, and, if necessary, adjusts the speed and/or phase of the variable speed motor 34 and thereby of its associated cylinder so that the cylinder is precisely registered with the incoming reference web during its speed match portion of its revolution. Thus, the glue spots 22, swatches 12, ends 10*a* and 10*b* of the sheets will be precisely located relative to the printed matter on the web which is likewise precisely positioned relative to the reference mark.

The gluing swatch placement and web cutting is controlled by a plurality of servo motor controlling feedback loops receiving various signals representing the position and rotation speed of an associated drum, the position of the web repeat mark, and the speed of the web. The feedback loops generally comprise a servo motor with encoder such as the Model 3200-1341 by Fenner Controls, a servo controller such as the M-Rotary by Fenner Controls, and a matching servo drive by Fenner Controls. The control of the feedback loop is performed in response to values stored in registers in the servo controller. Such values may be entered by operator interaction with a controller associated key pad such as key pads 409A–409I shown in FIG. 2. The loading of register values into the servo controller by means of the key pads 409A–409I is in the manner described in detail in the "M-Rotary Manual" by Fenner Controls.

The register values needed for operation are preloaded into the servo controllers before the operation of the swatch-placement apparatus.

While the system generally and usually works automatically, as above described, there may be instances, where the desired registration is still not being achieved; and, in such event, the operator may use the keypads 409A–409I as a fine tuning control to advance or retard the phase of the cylinder relative to the web. The fine tuning control generally involves adding or subtracting small increments to the register stored values of the servo controllers. For example (FIG. 4A), one register stored value, discussed below, represents the circumferential distance between a sync position 125 around the gluing drum 26 and the beginning 40 of a speed match portion of rotation. When the beginning of the speed match portion is found to occur too soon after the sync position, the register stored value can be incremented via the keypad 409A to slightly increase the distance between the sync point and the beginning of the speed match portion. Such fine tuning may also be exercised during swatch application when a human observer identifies that improvements can be made in the final product.

Each of the servo controllers, e.g. 56, 57, 58 and 59 of the swatch applying apparatus is connected by a bus 401 to a PLC controller 403 and a computer system 405 such as an IBM compatible personal computer. Values are entered into the PLC controller 403 from the keyboard 140 of the computer 405. The outputs of the PLC controller represent open and closed switch positions for the servo controller elective inputs. At the completion of a job, the PLC controller and the servo controllers 56, 57, 58 and 59 store all the information need to properly control the performance of the job. When the job is completed, computer 405 reads via bus 401 this information from the servo controllers and PLC controller and stores that information in permanent storage such as a hard drive 407. Should that same job be needed later, the necessary values are read from hard drive 407 and stored in the control registers of the servo controller and PLC controller via bus 401.

To assist in the registration of the swatches 12 to the sheet repeat length, the web 16 is pulled through the gluer station 24 and the swatch-applying stations 30 by a set of pull line feed rolls 64 and 65 (FIG. 2) which are adjusted as to speed by a servo control system responsive to the web marks 52. Web tension readings from a tension readout 66 (FIG. 2) are used by the operator to control web tension. After setting by the operator, the tension of the web is automatically controlled by a dancer control 78 to keep the web at a predetermined tension, which is usually a constant tension.

Figure 1:
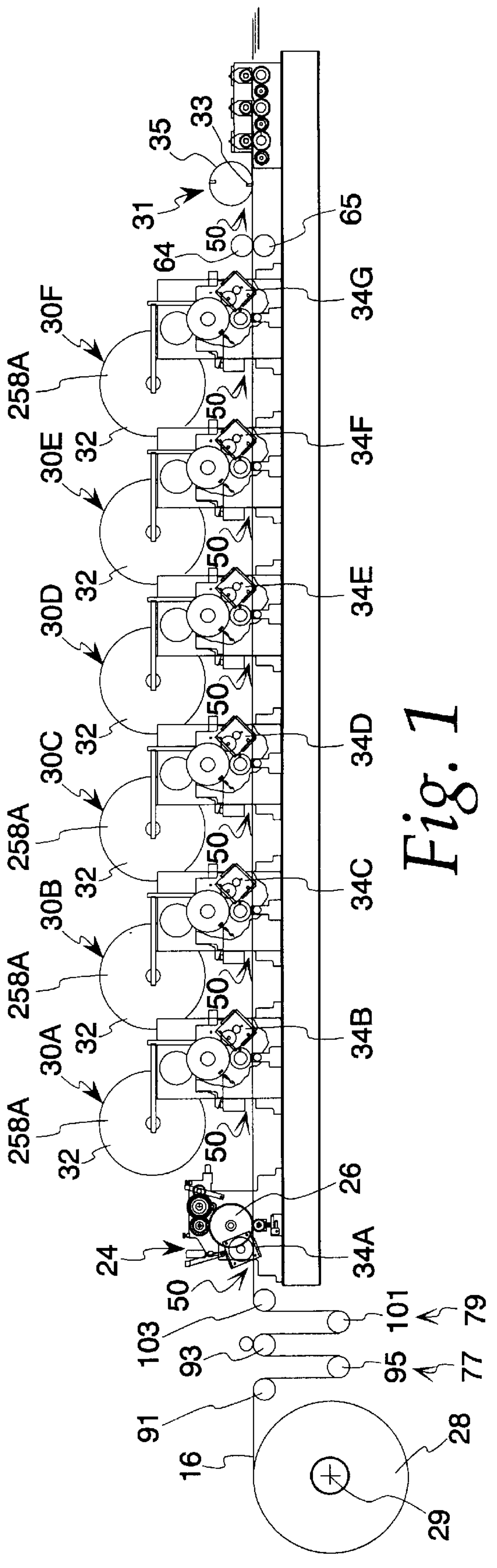
FIG. 1 is a diagrammatic view of the preferred apparatus for practicing the method of the invention.
Figure 2:
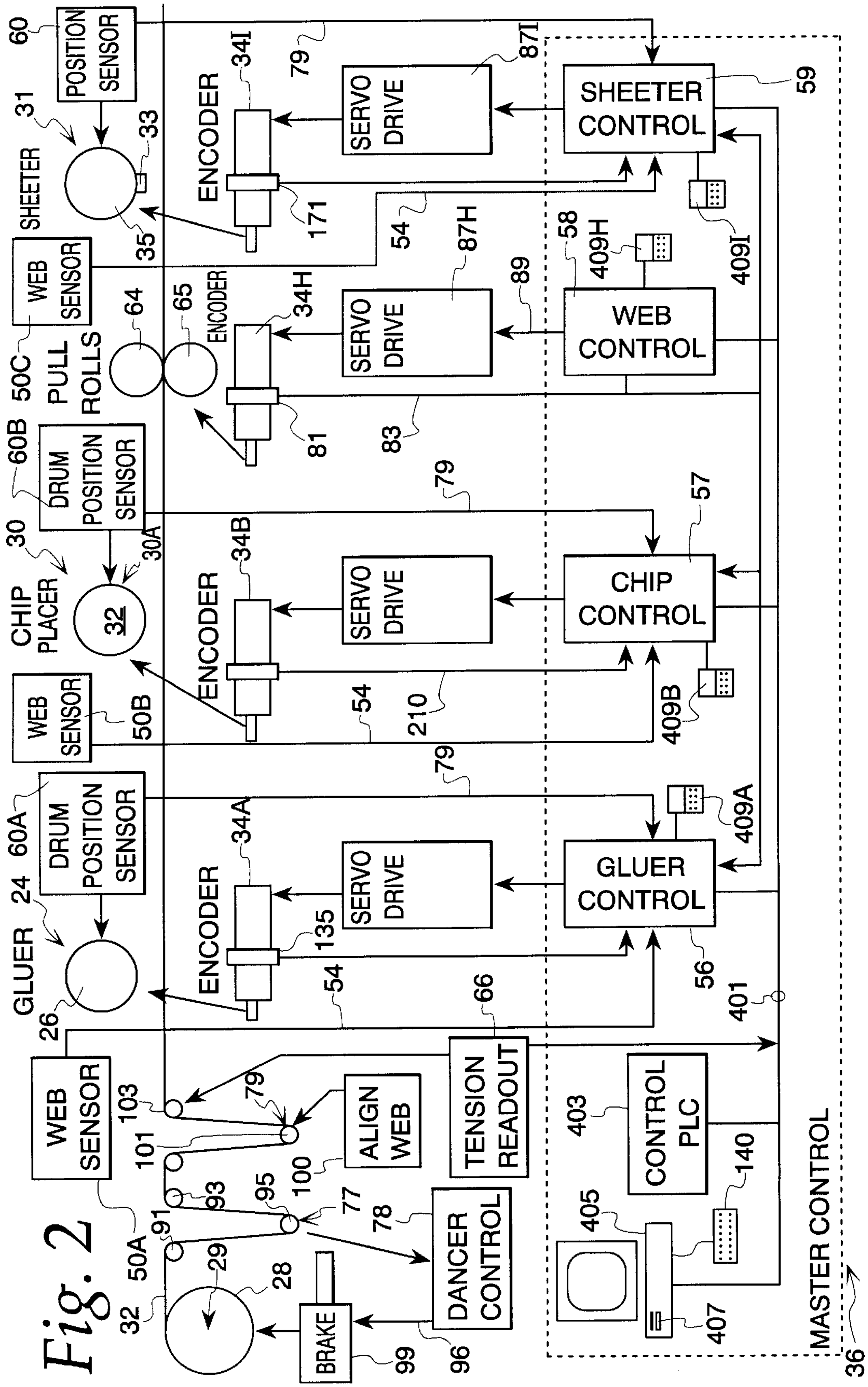
FIG. 2 is a schematic view of the controls for the apparatus of FIG. 1.

Referring now to FIGS. 1 and 2, a brief review of the preferred method of operation of the electrical and computer system for the preferred embodiment of the invention will be explained. The web 16 of material to receive swatches 12 is rolled into a roll 28 which is mounted to rotate about an axis 29. The web is unrolled from the roll and fed first through a tension adjusting dancer device 77, a web aligner 79 and on through the gluing station 24, the swatch or chip placement stations 30, the set of pull rollers 64, 65 and the sheet cutter station 31. The web is drawn from the roll during swatch placement by the pull rollers 64, 65, which are driven by a variable speed servo motor 34H. As is known in the art, servo motor 34H includes an encoder 81 which generates a rectangular wave signal on a conductor 83 to represent the rotation speed of the motor. The signal on conductor 83 is applied to a web speed servo motor controller 58 which compares the motor speed received on conductor 83 with a stored motor speed indication previously loaded into the controller 58 by an operator. Since the motor 34H is fixed geared to rollers 64 and 65, the speed of the motor is directly proportional to the speed of the web 16. Web speed controller 58 compares the motor speed on conductor 83 with the stored motor speed and transmits error signals when they are not the same to a servo drive unit 87H via a conductor 89. Servo drive controller 58 responds to such error signals by controlling the speed of the motor 34H to minimize the error signal from web speed controller 58 and maintains a substantially continuous web speed.

The preceding servo control loop is relatively well known and accurately controls the linear speed of the web 16 as it unwinds from roll 28. The tension in the web as it unrolls is maintained relatively constant by the dancer device 77 (FIG. 2), which is under the control of a dancer tension control 78. The dancer device includes two fixed rollers 91 and 93 to support the web 16 with a movable roller 95 between the two fixed rollers. The movable roller 95 is driven upwardly or downwardly by a conventional chain and motor drive system, well known in the art. At balance, the tension in the web 16 is such that the movable roller 95 remains stationary. When too much tension is in the web, roller 95 will be forced upward, which is sensed by the dancer control 78 which also sends a signal over line 96 to a brake unit 99 to decrease the braking force being applied by the brake unit 99 to the roll 28. Alternatively, when tension decreases, roller 95 moves downward and dancer control 78 causes an increase in the braking force on roll 28 until the roller 95 moves to its neutral position.

The web aligner 79 is a commercially available unit which includes a photoelectric unit which senses the edge of the web and through the operation of an alignment controller 100, shifts the axis of rotation of a roller 101 to keep the web edge located within predetermined tolerances. One roller 103 of web aligner 79 includes a strain gauge as a tension sensor, the output of which is used to produce a visual output at the tension readout 66 for the operator to adjust overall tension.

When the pull rollers 64 and 65, tension control 66 and web aligner 79 are functioning, the web 16 moves at a fixed rate from left to right in FIG. 2 and at a predetermined tension and speed. The placement and gluing of swatches 12 on the web and the separation of the web into fixed sized sheets 10 is done while the web is continuously being moved. The gluer 24 is used to place the glue spots 22 on the web and the chip placer cylinders or chip placer units 32 at the swatch-applying stations 30 are used to place the swatches onto the previously applied glue spots. FIG. 2 shows a single gluer station 24 and a single chip placer station 30; however, multiple such units, such as the six or more chip applying stations 30 shown in FIG. 1, are usually employed in a production level machine. The web is preprinted with the marks 52 defining a recurring repeat and the swatch bearing sheets 10 are produced to the same length as the repeat length. The chip placer unit 32 places a single row (across the web) of swatches during swatch application cycles and one such application cycle is performed on each repeat length. Accordingly, when six rows of swatches are needed on a repeat length, six chip placer units 32 will be used, one for each row. A single gluer station 24 may be used to place all glue spots for multiple chip placers or a gluer may be used to place only one, two or three rows of glue spots with subsequent gluers being used to place other needed rows of glue spots. Multiple gluers would be used, for example, when the glue could dry before being used to secure a swatch or when a repeat length did not allow sufficient time to place all rows of glue spots. The additional gluers may be positioned between multiple chip placers.

Figure 4:
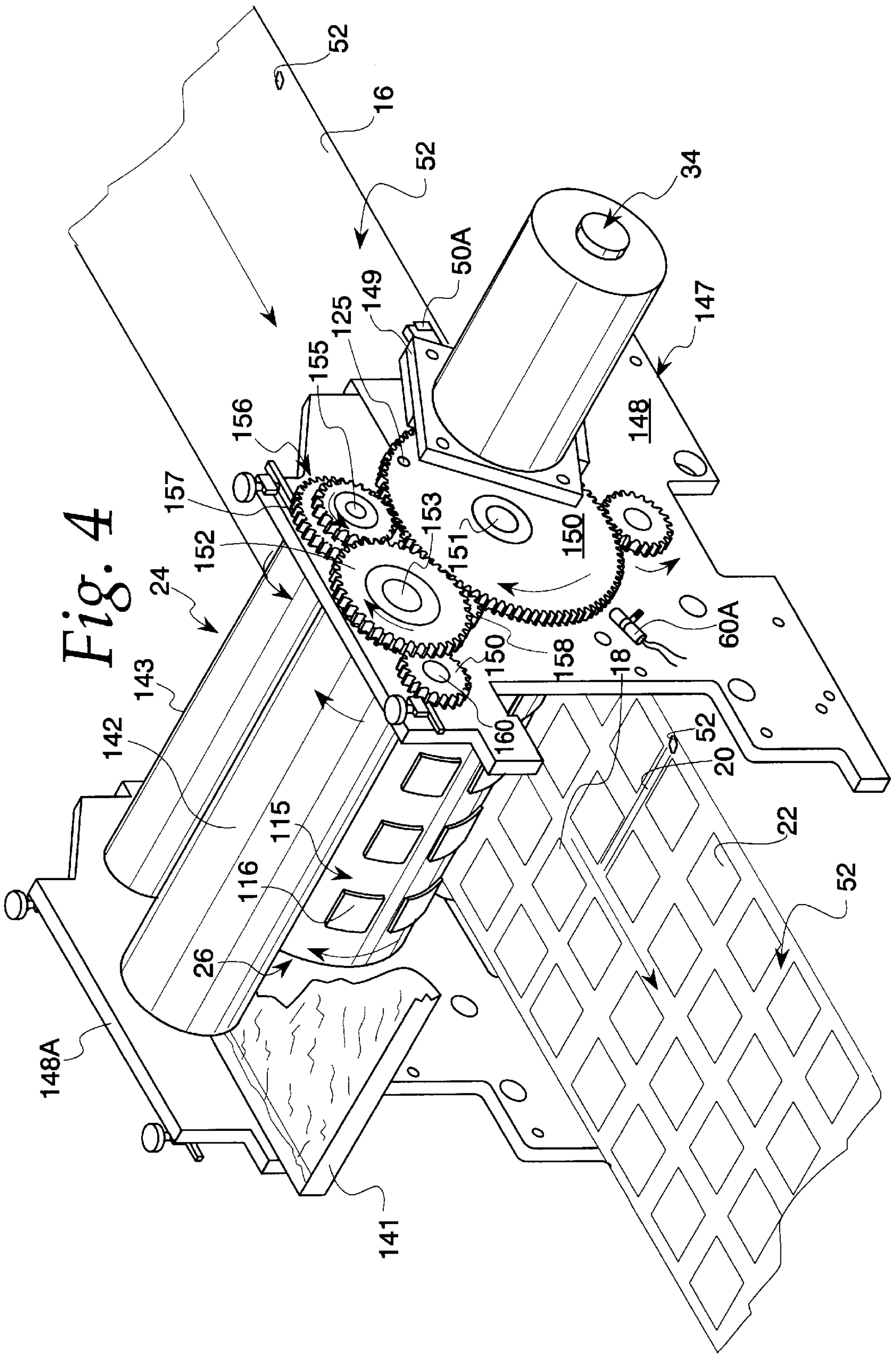
FIG. 4 is a perspective view of a gluer station for applying glue spots to the web.
Figure 4A:
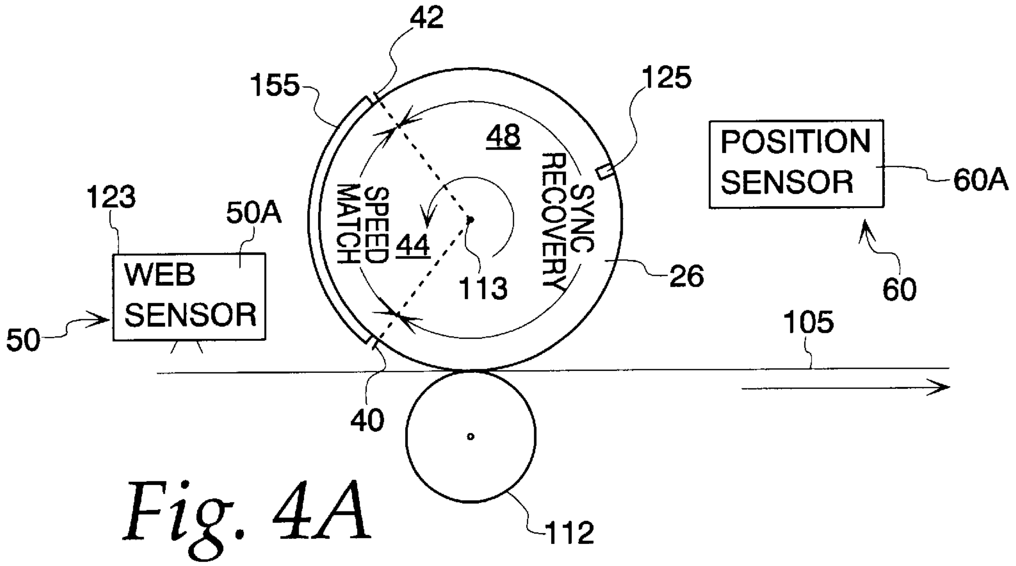
FIG. 4A is a diagrammatic view of the glue cylinder and the controls used to match the web velocity during the speed match portion of the glue cylinder's rotation and to shift the phase of the glue cylinder during the speed swatch portion of the glue cylinder's rotation.

The gluer station 24, as best seen in FIGS. 4 and 4A, includes the cylinder 26 rotating about a horizontal axis and having a glue position template 115 on its surface. The template has raised sections 116 which are coated with glue once per revolution. The raised portions of the template are brought into contact with the web 16 once per revolution of cylinder 26 and deposit their glue coating onto the web. When contact with the web is made, the template bearing part of the cylinder must be moving at the same speed as the web and the position of the template must be in register with preprinting on the web. FIG. 4A shows the cylinder 26 and its control apparatus to assure the above conditions are met.

FIG. 4A shows web 16 traveling between gluer cylinder 26 and a pressure web cylinder 112 which is used to hold and to press the web upwardly against the template 115 when glue is being deposited. FIG. 4A also shows a position sensor 60*a*, a magnetic spot 125 and a web position sensing photoelectric unit 50*a*. The magnetic spot 125 is shown in FIG. 4A as a part of the drum 26 to represent its significance; however, in the preferred embodiment the spot 125 may be placed on drive gear 150 for the drum 26 which rotates once per drum 26 rotation as shown in FIG. 4. Each revolution of the glue cylinder is considered a gluing cycle and during the speed match portion 44, the cylinder 26 must rotate with a circumferential velocity equal to the velocity of the web 16. The remainder of the cycle, i.e., sync recovery portion 48, the cylinder must rotate at a sufficient rate to begin the next speed match portion at the appropriate position with the web.

Figure 6:
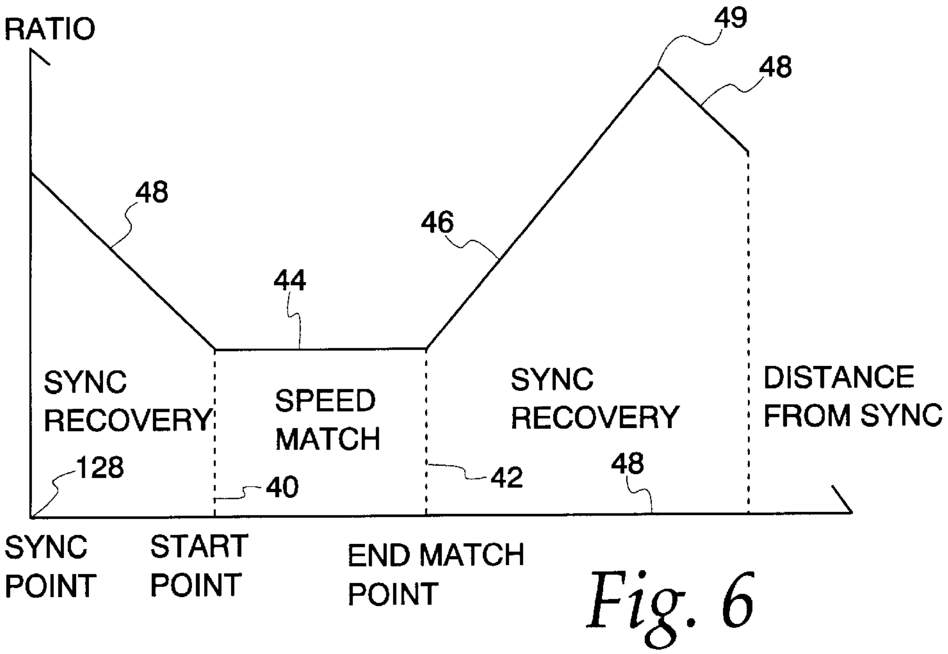
FIG. 6 is a timing diagram showing the speed match and the sync recovery portions of a cylinder's rotation.

At the gluer station, the controller 56 (FIG. 2) which receives feedback input signals and which in response thereto controls the motor 34A driving cylinder 26 to perform a proper velocity profile during each cycle. The controller may, for example, be a control M-Rotary by Fenner Controls. Such a velocity profile for one cycle is shown in FIG. 6. One input feedback signal which is connected to a feedback sync input of controller 56 is generated by the magnetic spot 125 sensed by position sensor 60, and this identifies a sync start point 40 during each cycle. The sync point signal identifies a starting point from which the position of cylinder 26 can be determined during a cycle. Intermediate positions during a cycle are determined by signals from an encoder 135 (FIG. 2) which comprise a rectangular wave identifying rotation of motor 34A. The speed of the web, as represented by an encoder signal on conductor 83, is connected to an external reference input to gluer control 56 so that the web speed can be a part of the control functions. Additionally, a signal from the glue station's web sensor 50A is applied over line 54 to an external reference sync input of controller 56 to identify the location of the preprinted reference mark on web 16.

During setup, operational parameters are entered into gluer control 56 by means of a keypad 409A (FIG. 2) to define the control points of a cycle. One parameter represents the circumferential distance between the preset sync point 125 on the drum 26 to the beginning 40 of the speed match portion 44 with the bottom of the cylinder 26. This parameter may be set in a register CP-93 of a M-Rotary controller. Another parameter is the circumferential distance between the sync point 125 and alignment of the end 42 of the speed match portion with the bottom of cylinder 26. This parameter may be entered into register CP-94 of a M-Rotary controller. These parameters are entered as a number of 0 to 1 transitions of the encoder signal from encoder 135. Also entered is a parameter identifying the distance between the web reference mark 52, as sensed by web sensor 50A, and the beginning of the speed match portion of the cycle. With a M-Rotary controller, this parameter is entered into register CP-31. The controller 56 uses the rotation speed received from encoder 135 to identify the circumferential speed of gluer cylinder 26 during web match and it computes the speed needed during sync recovery 48 to return the start of speed match portion at one repeat distance of the web. When the circumference of cylinder 26 is longer than the pattern repeat distance, the speed profile during a cycle is web match speed while the template raised portions 116 are in contact with the web and a higher speed during the sync recovery speed portion 48 to return the glue template 115 to the web at the appropriate time.

Figure 7:
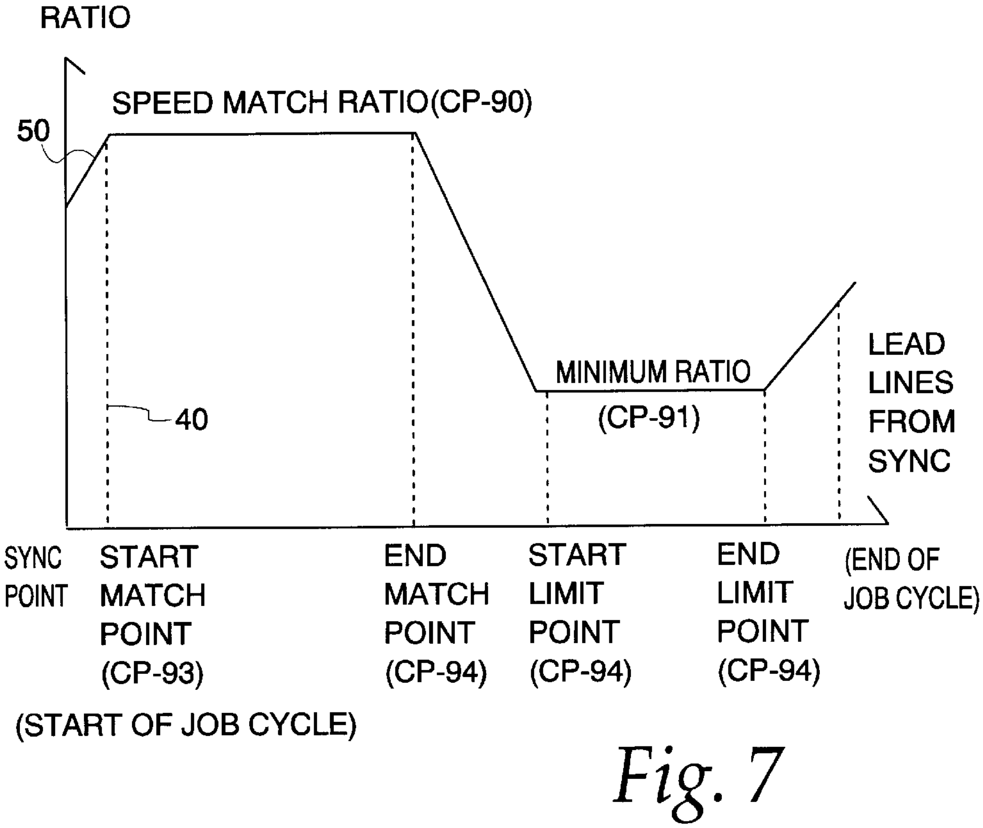
FIG. 7 is a timing diagram for the start of a job cycle and end of a job cycle.

When the machine begins the gluing operation, cycles profiled as shown in FIGS. 6 and 7 are performed but such cycles may not be synchronized with the printed pattern including reference marks 52 on the web 16. Controller 56 responds to the web sensor output by generating error signals to servo drive motor 34A for speeding up or slowing down the rotation of cylinder 26 until the distance between web reference mark and the start match point 40 equals the parameter value entered during setup. During normal operation controller 56 continues to make the minor corrections needed to maintain the above equality. Also, during job setup it may be necessary to change the preloaded parameters by small amounts to achieve the desired precision of glue placement.

As disclosed more fully in U.S. Pat. No. 4,061,521, the adhesive is picked up from a tray-shaped glue pan or reservoir 141 by a first roller 142 (FIG. 4), which has its lower periphery rotating through the adhesive in the tray. A metering roller 143 contacts the first roller 142 to meter the adhesive which is transferred by a transfer roller 145 to the raised, adhesive-applying pads 116 on the template 115 on the cylinder 26. The template 115 is preferably a removable and replaceable sheet of mylar or the like detachably fastened to the cylinder 26. Thus, different sheet templates may be fastened to the cylinder for different jobs to provide different spacing and sizes of adhesive spots to the web 16 for different jobs.

Figure 5:
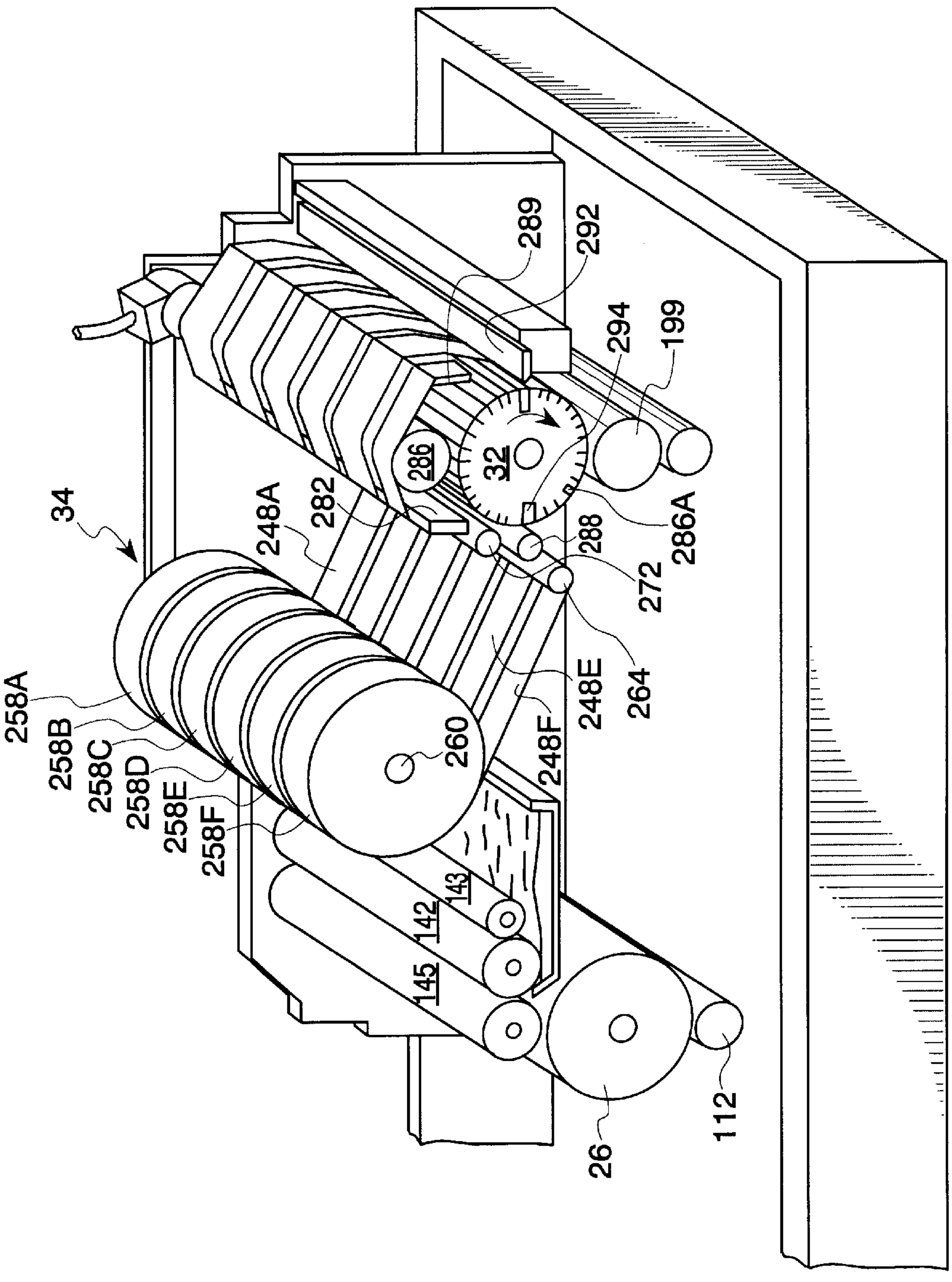
FIG. 5 is a perspective view showing the glue station and an adjacent swatch making and applying station.

As best seen in FIGS. 4 and 5, the adhesive-applying cylinder 26 and the applicator rolls 142, 143 and 145 are continuously driven by the variable speed motor 34*a* through a gear system. The glue station includes an upstanding frame 147 which has a vertical wall 148 having a bracket 149 mounting the variable speed motor in a substantial horizontal position with its pinion gear meshed with a large central gear 150 fixed to an end of a cylinder shaft 151 that is mounted in the frame 147 and supports the glue applying cylinder 26 for rotation about a horizontal axis. The large gear 150 is meshed with gear 152 fastened to a rotatable shaft 153 for the pick-up roller 143. The gear 152 is meshed with a gear 155 of a one-way pawl ratchet mechanism 156 that drives the metering roller 143 in the direction shown in FIG. 4. A gear 157 of the pawl and ratchet mechanism drives an idler gear 158 mounted on the frame to drive a gear 159 fixed to the end of a mounting shaft 160 for the glue transfer roller 145. Mounted to the other side of the frame member 148*a* of the frame 147 is a one-way pawl and ratchet mechanism and a small drive motor (not shown). This small drive motor will drive the shaft 160 and through gears 157, 158 and 159 will drive the rollers 142, 143, and 145 in the reverse directions when the servo controlled, servo motor 34 is stopped so that the glue does not dry on these rollers when the web 16 is not traveling. The one-way drive pawl and ratchet mechanisms allow this reverse drive without turning the cylinder 26 or its attached gear 150.

At the severing station 31 (FIG. 2), there is a controller 58, servo motor 34I, servo drive 87I, encoder 171, web sensor 50C and position sensor 60, which are substantially the same as above-described for the operation of gluer unit. With the severing operation, the length of the speed match portion 44 of a cycle can be reduced due to a short length that the knife 33 must travel at web speed to do the severing. As with the set up of the gluer the parameters of operation defining the circumferential position of speed match and sync recovery portions are initially entered by an operator via keyboard 409I associated with the sheet controller 58.

The general operation of the chip placer unit 32 at each of the chip applying stations 30 is also substantially the same as the operation of the gluer unit. A significant difference exists, however, since a first swatch cylinder 32 is used to cut the row of swatches 12 and convey them to a second, smaller transfer 35 cylinder 199 (FIGS. 5 and 5A) for placement on the web 16. Both the swatch cylinder 32 and the transfer cylinder 199 are rotated by an associated one of the motors 34B–34G via gears which cause the associated cylinder 32 to rotate twice as fast as cylinder 199. The cycle of operation for chip place unit is one revolution of the larger chip cylinder 32 so that the chip transfer cylinder 199 rotates twice per cycle. The transfer cylinder 199 has a circumference which is one-half of the circumference of cylinder 32 so that their circumferential velocity is the same. The chip placement cycle is made up of one revolution of chip cylinder 32 and accordingly, two revolutions of transfer cylinder 199. A position mark 125 (FIG. 4B) is placed is placed on chip cylinder 32 and read once per revolution by a position sensor 60B. As with the gluer unit, the position sensor signal and an encoder signal from the encoder 135A representing the rotation of motor 34B are applied over lines 210 and 79 (FIG. 2) as inputs to the chip placer controller 57. The chip placer unit also includes a web sensor 50 which senses the preprinted marks 52 on the web 16 and sends signals over line 138*b* to the controller 57 when the mark 52 is sensed. As with the other servo controllers, controller 57 also receives web speed representing signals on lead 83 from encoder 81 of motor 79.

Figure 4B:
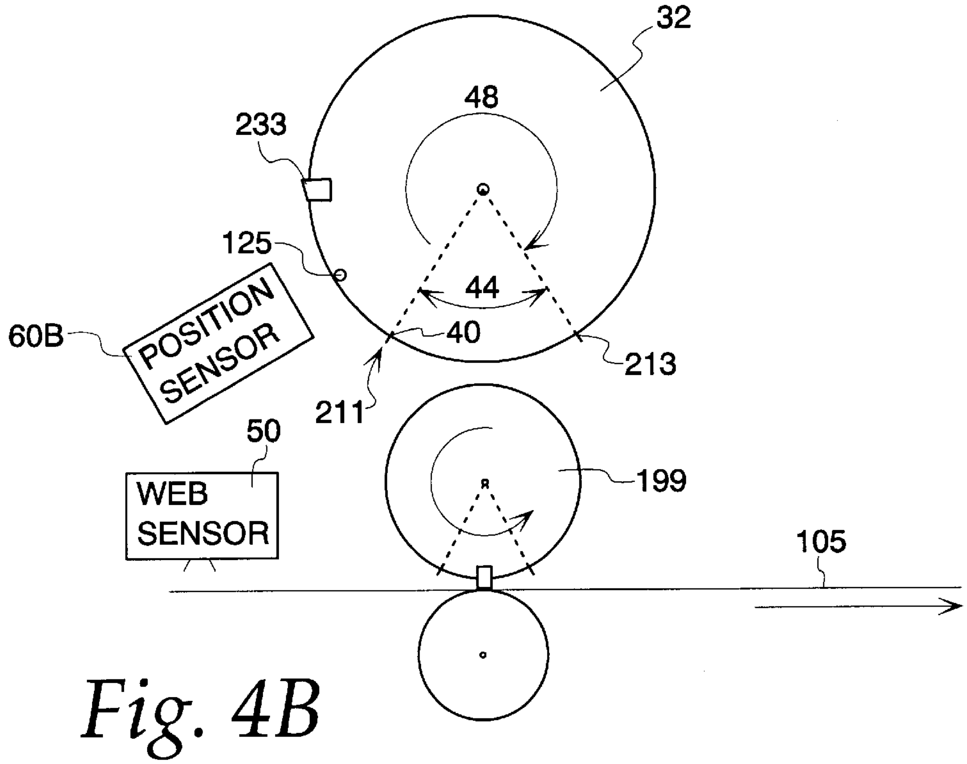
FIG. 4B is a diagrammatic view of the swatch-applying station and the controls used to provide the speed math portion and the speed match portion of the swatch cylinder's rotation.

To initialize the chip placer unit 32, as best seen in FIG. 4B, the distance between the position mark 125 and a start match point 40 and between the position mark and an end match point 42 are entered into controller 57 to define the web match portion 44 and sync recovery portion 48 of a cycle. The circumferential speed of the cylinders 32 and 199 is set by controller 57 to be the same as the web speed provided from pull roller encoder 81 on the conductor 83. The speed of rotation during the sync recovery period is determined by the controller 57 to be an amount to return to the start point 40 of the web speed match portion 44 at the appropriate time.

Figure 5A:
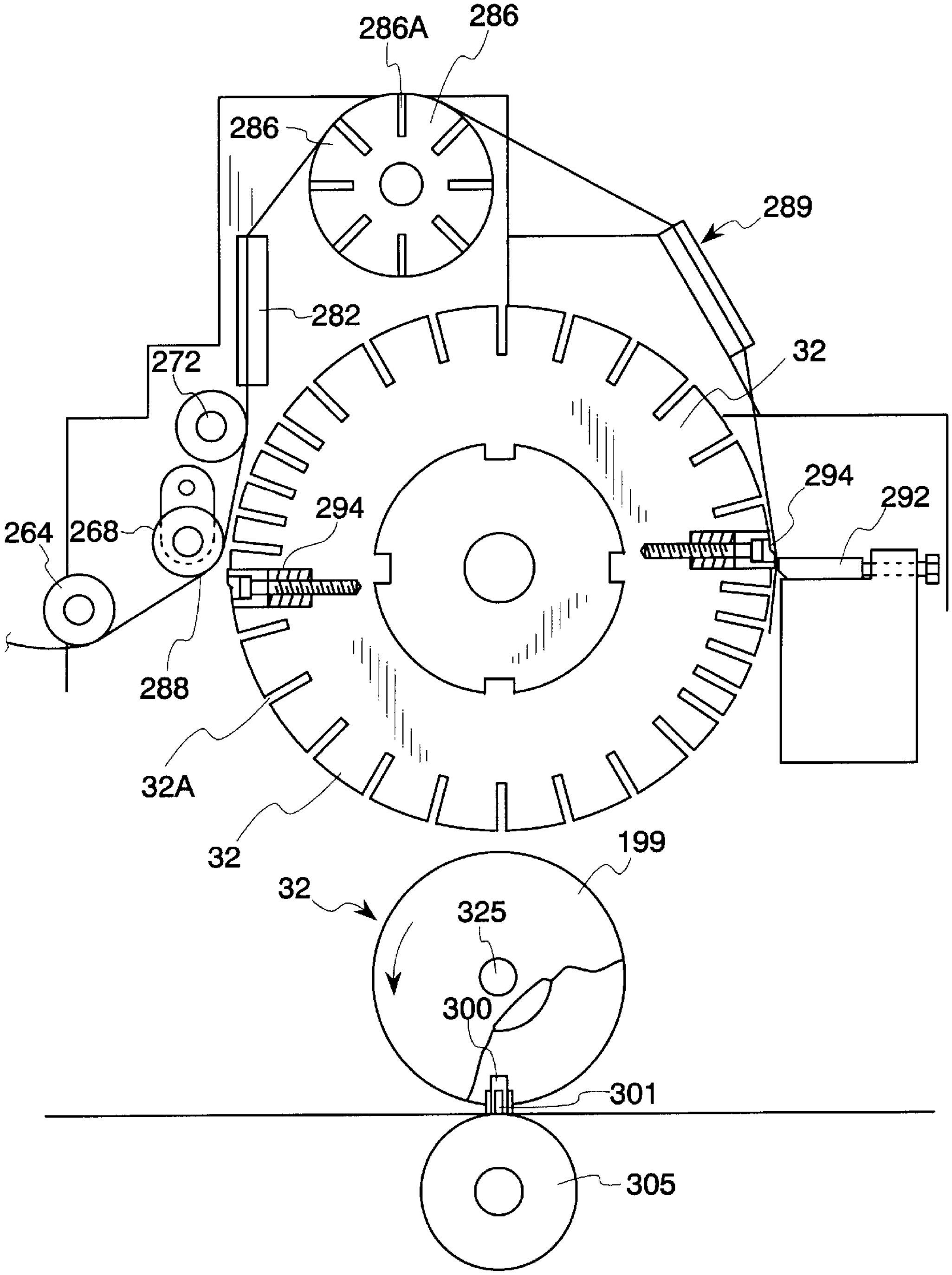
FIG. 5A is a view of the swatch station for cutting swatches from ribbons and applying the swatches to the web.

Referring now to FIGS. 5, and 5A, the swatches 12 are preferably made and transferred to the transfer drum 199 for application to the web 16 substantially in the same manner as described in U.S. Pat. No. 4,061,521. As described therein, each of the colored swatches 12 is severed from one of ribbons 248A–248F (FIG. 5) each being unwound from one of ribbon reels 258A–258-F mounted on a supporting spindle 260 carried by the machine frame. The reels are separated by spacers on the spindle 260. Each colored ribbon is guided to travel from its respective reel under a rotatable, free-wheeling roller 264 and past a pivoted dancer or tension roller 288 (FIG. 5A), which is positioned above the ribbons to engage and to push against the top surface of the ribbons to keep the ribbon tension constant for a predetermined period of time. From the tension roller 288, the ribbons travel upwardly past a guide roller 272 to a vertical guide plate 282, which has slots therein to guide the ribbons along parallel paths. Then, the ribbons travel over the top of a vacuum feed roller 286 which pulls the ribbon thereagainst with a suction force. The vacuum feed roller is power-driven by the variable speed motor through gears, as will be explained, to unwind a predetermined length of ribbon from its associated reel for each rotation of the swatch cylinder 32. The application of the vacuum is selectively controlled to a series of the vacuum slots 286*a* in the vacuum feed roller. A vacuum control valve and a replaceable vacuum sheet, as described in the aforementioned patent (but not shown herein), provides customized vacuum application to each ribbon for each job. That is, a new vacuum sheet with appropriate pin holes to grip and feed a given length and width of ribbon will be used for each of the different jobs. The ribbons, as they travel downwardly to be severed into chips, are guided by a side edge guide plate 289 to the swatch cylinder 32, where ends of the ribbons will be severed to form the individual swatches.

The swatches 12 are severed from the ribbons 248A–248F by a stationary anvil 292 which cooperates with a rotating blade 294 on the swatch cylinder 32. As best seen in FIG. 5A, the severing blade 294 is in the form of a bar with a sharp cutting edge to shear all of the ribbons simultaneously, which are between the rotating knife edge and the anvil blade 292. The swatch cylinder 32 is also a vacuum drum having a plurality of vacuum slots 32A therein to carry the ends of the ribbons down past the stationary anvil blade 292, and after being severed into swatches 12, to carry the severed swatches 12 downwardly to the transfer cylinder 199. As explained in the aforementioned patent, the ends of the ribbons extending above the anvil blade 292 slide along the rotating cylinder surface until a vacuum control valve (not shown) allows suction in the slots 32A to pull the ribbons tightly to the cylinder's peripheral surface and pull the ribbons down a short distance to allow the ribbons to be cut as the rotating blade 294 again comes past the stationary anvil blade. To provide suction for various widths of ribbons and lengths, the suction grooves 32A are covered with a removable and replaceable plastic sheet (not shown) having pin holes therein aligned with the ribbon width and extending for the length of ribbons to be cut, as disclosed in the aforementioned patent.

The severed swatches 12 are held against the swatch cylinder's peripheral surface and are carried on this peripheral surface to a nip formed with an apertured transfer bar 300 (FIG. 5A) on the transfer drum 199. The transfer drum is connected to a suction line (not shown) at the time that the apertured transfer bar 300 is at the top of its rotational travel. The transfer bar extends above, e.g., ⅛ inch above the transfer drum cylinder's surface to contact the painted side of the swatches opposite the transfer bar. Negative air pressure in the suction transfer is applied through ports 301 to grip the swatches at the same time that positive air pressure is being applied to the slots 32A in the transfer cylinder to provide positive blowing air to assist in the transfer of the swatches to the transfer bar. When the transfer, apertured bar has rotated downwardly for about 180° to bring the swatches over the glue spots 22 on the web, a transfer air valve causes positive pressure air to blow through the ports 301 in the transfer bar to blow off the swatches to assist in transfer of the swatches to the web 16. The transfer bar 300 presses the swatches against the adhesive spots 22 while a back-up, pressure roller 305 beneath the web 16 maintains the web against the force of the transfer bar. The pressure roller is driven at the same speed as the swatch cylinder 32, as will now be described.

Figure 8:
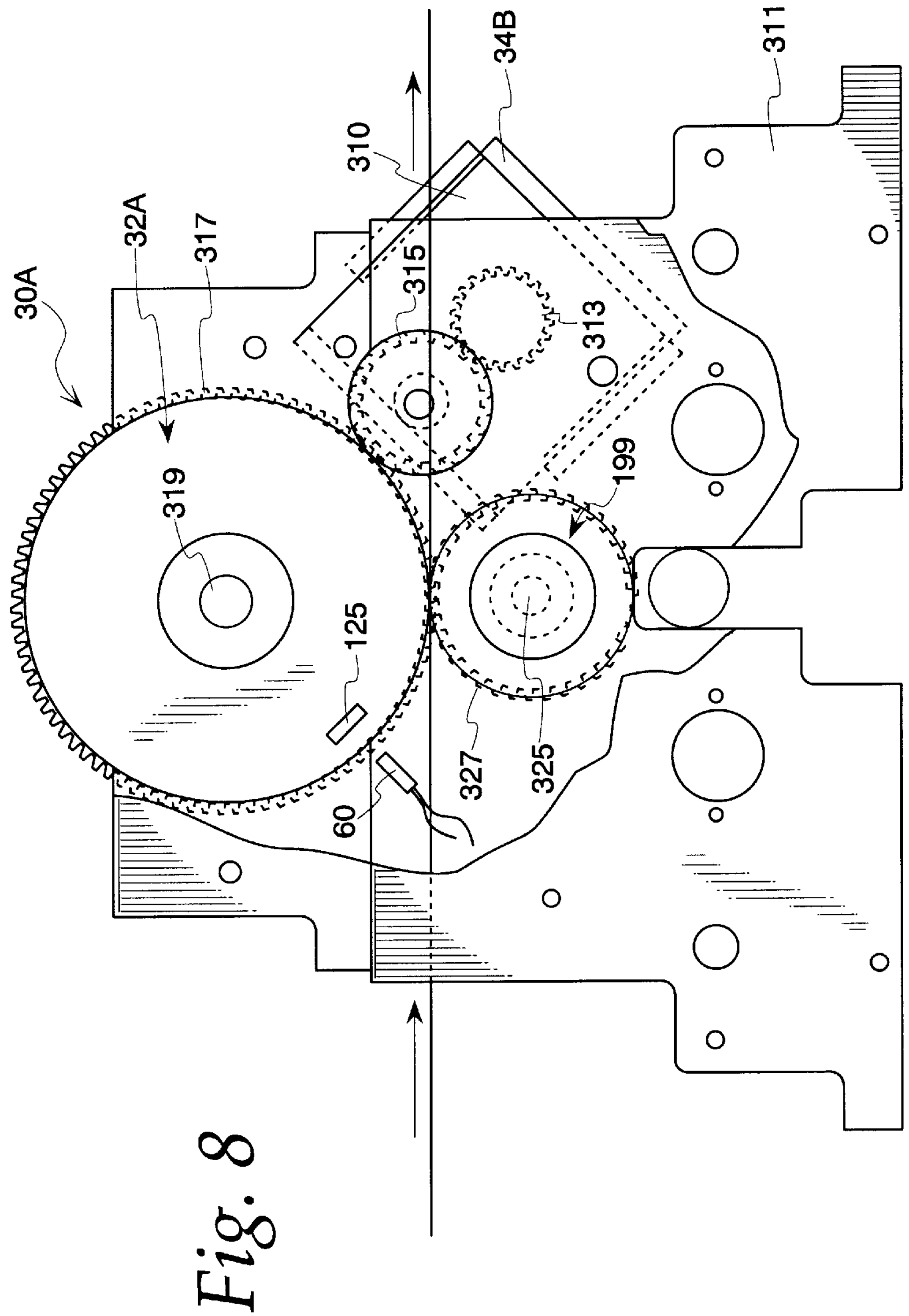
FIG. 8 is a view showing a variable speed motor drive at the swatch-applying station.

As best seen in FIG. 8, the variable speed, servo motor 34B for the swatch cylinder station, is mounted by a bracket 310 to a side frame 311 of the frame 148 to extend horizontally with a pinion drive gear 313 of the motor driving an idler gear 315, which is meshed with a large gear 317, fastened to mounting shaft 319 for the swatch cylinder 32A. The transfer drum 199 has a mounting shaft 325 to which is attached a gear 327, which is meshed with the large gear 317 for the swatch cylinder. Thus, as the variable speed motor drives the swatch cylinder 32B through the speed match portion 44 and sync speed portion 48 at their respective speeds the transfer cylinder is likewise driven at the same speed. Likewise, the variable speed motor 34B drives the ribbon feed drum 286 through gears connected to the large swatch gear 317. When changing from one job to the next, the gear for the ribbon feed drum 286 is manually changed to provide the proper speed of ribbon feed. This is the only gear that needs to be manually changed from one job to the next in the apparatus described herein. The gear drive for the ribbon feed drum is also disclosed in the aforesaid patent.

As above explained, usually six to fourteen swatch-applying stations 34 are in a straight line each to apply one row of swatches 12 to the web 16 between reference marks 52 for each sheet. Because the web may stretch one or more thousandths between successive swatch-applying stations, web sensors 50 at each station may sense the incoming mark 52 and apply web position signals to its associated controller 57. As previously described, the controller 57 generates error signals, based in part on the web position signals, which cause servo motor 34B to have registration of its swatches precisely to the printed pattern on the web. As best seen in FIG. 8, the phase of the swatch cylinder at each swatch-applying station is determined by its magnetic drum position sensor 60 and a metal piece or magnet position mark 125 which is fixed to the gear 317 to rotate and actuate the transducer once each revolution of the swatch cylinder 32A. Other forms of drum position sensors could be used than that described herein.

Figure 9:
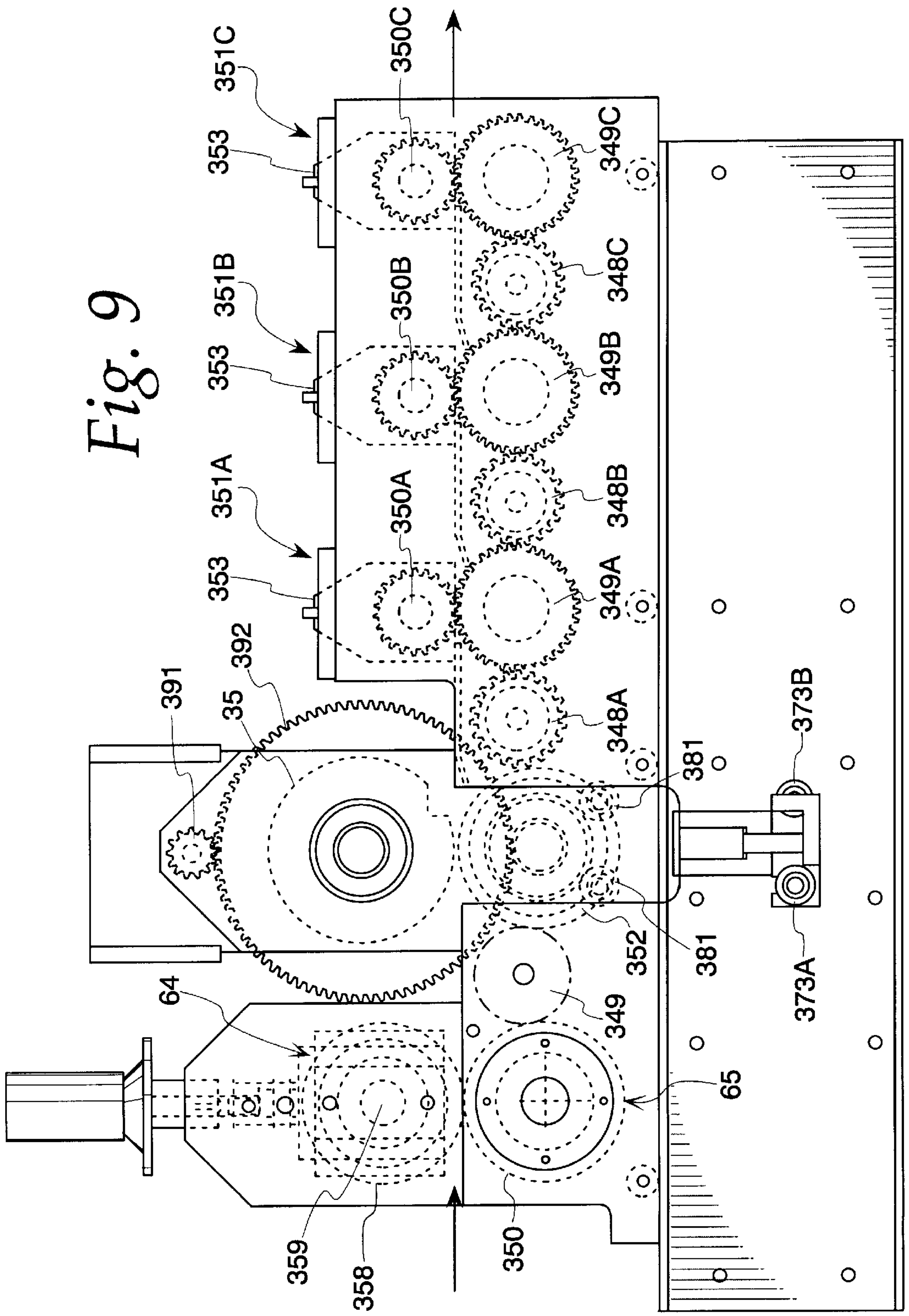
FIG. 9 is a view showing a variable speed motor drive for the web feed rollers, the anvil roller and the presser rollers.
Figure 10:
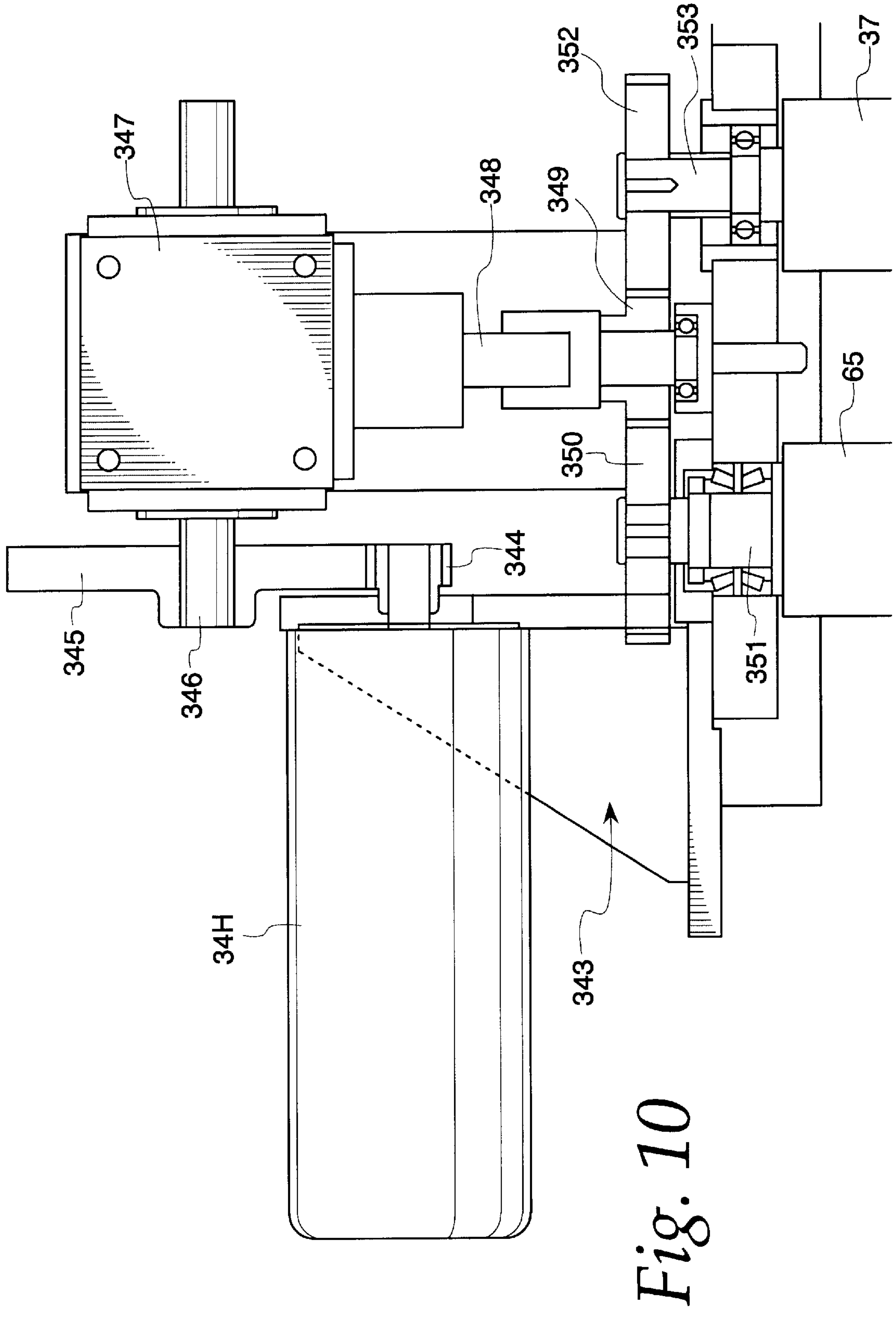
FIG. 10 is a plan view of the variable motor speed motor and gear reducer for the web feed roller and anvil roller.
Figure 11:
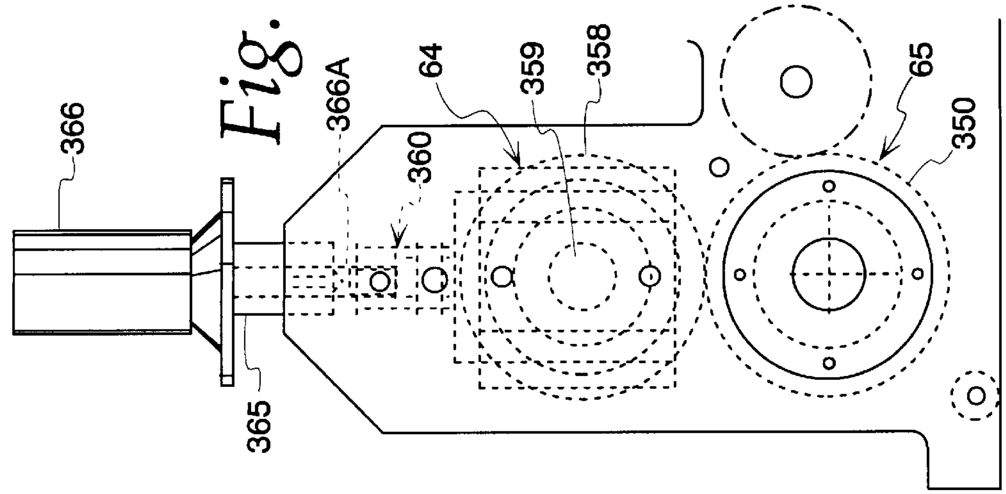
FIG. 11 is a side elevational view of the drive for the upper web feed roller.

After having passed through all of the swatch-applying stations, the web and the swatches thereon travel into the nip of the pull rolls 64 and 65 (FIGS. 9–12). The lower pull roller 65 is driven by the variable speed motor 34H which, through a series of gears, also rotates an anvil roller 37 (FIG. 10) at the severing station 31 and three sets of pressure rollers 351*a*, 351*b* and 351*c* mounted downstream of the severing station 31. As best seen in FIG. 9, all of the drive for the line feed is located below the web 32 and on one side of the machine; while all of the variable speed motors for the gluing station 24, the swatch-applying stations 30 and severing station 31 are located above the web 16 and on the other side of the machine's frame. As best seen in FIG. 10, the line feed motor 34H is mounted on a bracket 343, and its pinion 344 is driving a gear 345 fixed to an input shaft 346 of a right angle gear unit 347 that has an output shaft 348 carrying a drive gear 349, which is meshed with nip roll gear 350 fixed to a shaft 351 carrying the lower feed roller 65. The drive gear 349 is also meshed with a gear 352 fixed to a shaft 353 for the cutter anvil roller 37. Thus, the variable speed, line feed motor 34H drives both the lower feed roller 65 and the cutter anvil roller 37 at the same speed, which is the web line speed. As best seen in FIG. 11, the gear 350 driving the lower feed roller 65 is meshed with an upper gear 358 fixed to a shaft 359 carrying the upper nip feed roller 64. Thus, both the line feed rollers 64 and 65 are driven together at the same speed by the line feed motor 34H.

Figure 12:
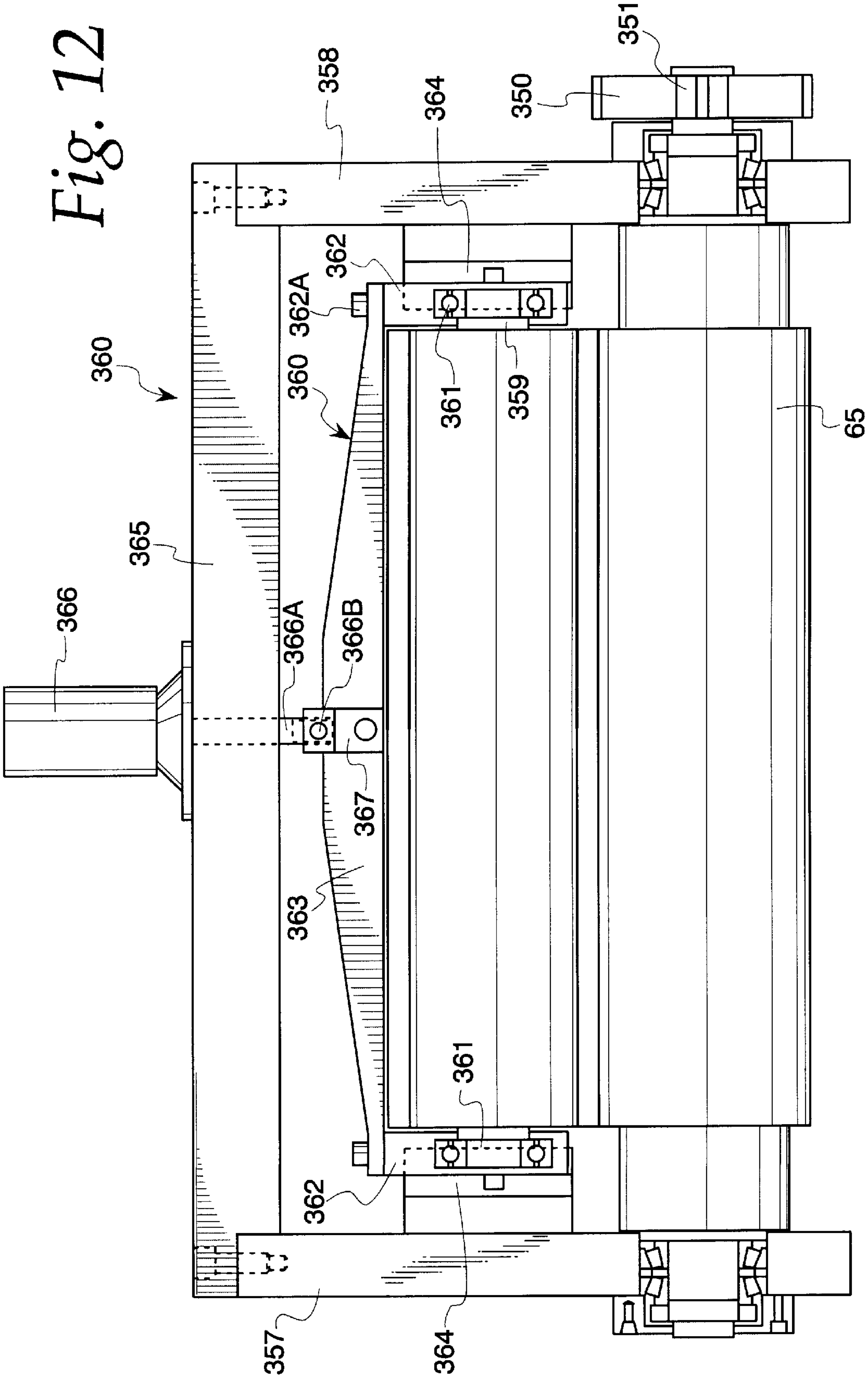
FIG. 12 is a front elevational view showing the preferred mounting of the upper web feed roller.

As best seen in FIG. 12, the upper feed roller 64 is slidably mounted for vertical movement relative to the lower feed roller 65 to adjust the size of the nip for the thickness of the web 32 and/or swatches thereon and to be moved to an upper, release non-effective position. The mounting shaft 359 for the upper feed roller is mounted in a vertically slidable yoke 360 which has bearings 361 carried in vertical yoke arms 362 fixed by bolts 362*a* to a horizontal, cross bar 363 of the yoke. The yoke slides 362 are guided for vertical sliding movement in stationary slide blocks 364 carried by vertical frame members 357 and 358. Across the top of the vertical frame members 357 and 358 is a horizontal frame bar 365, which supports a fluid cylinder 366 having a depending piston rod 366*a* connected by a pin 366*b* to a clevis 367 fastened to the yoke cross bar 363. The fluid cylinder 366, which is preferably a pneumatic, double-acting cylinder, is operated to push the upper feed roller 64 against the top of the web with a force that may be varied by the machine operator, and to lift the upper feed roller 64 to open the nip after completion of a job or when it is desired to release the grip on the web.

Figure 14:
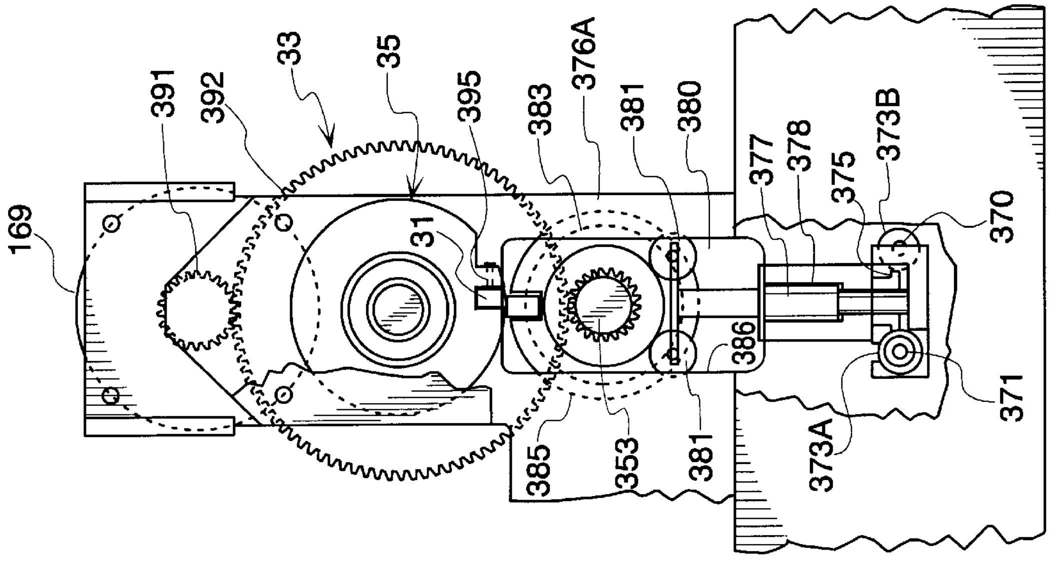
FIG. 14 is a side view of the cut-off station shown in FIG. 13.
Figure 13:
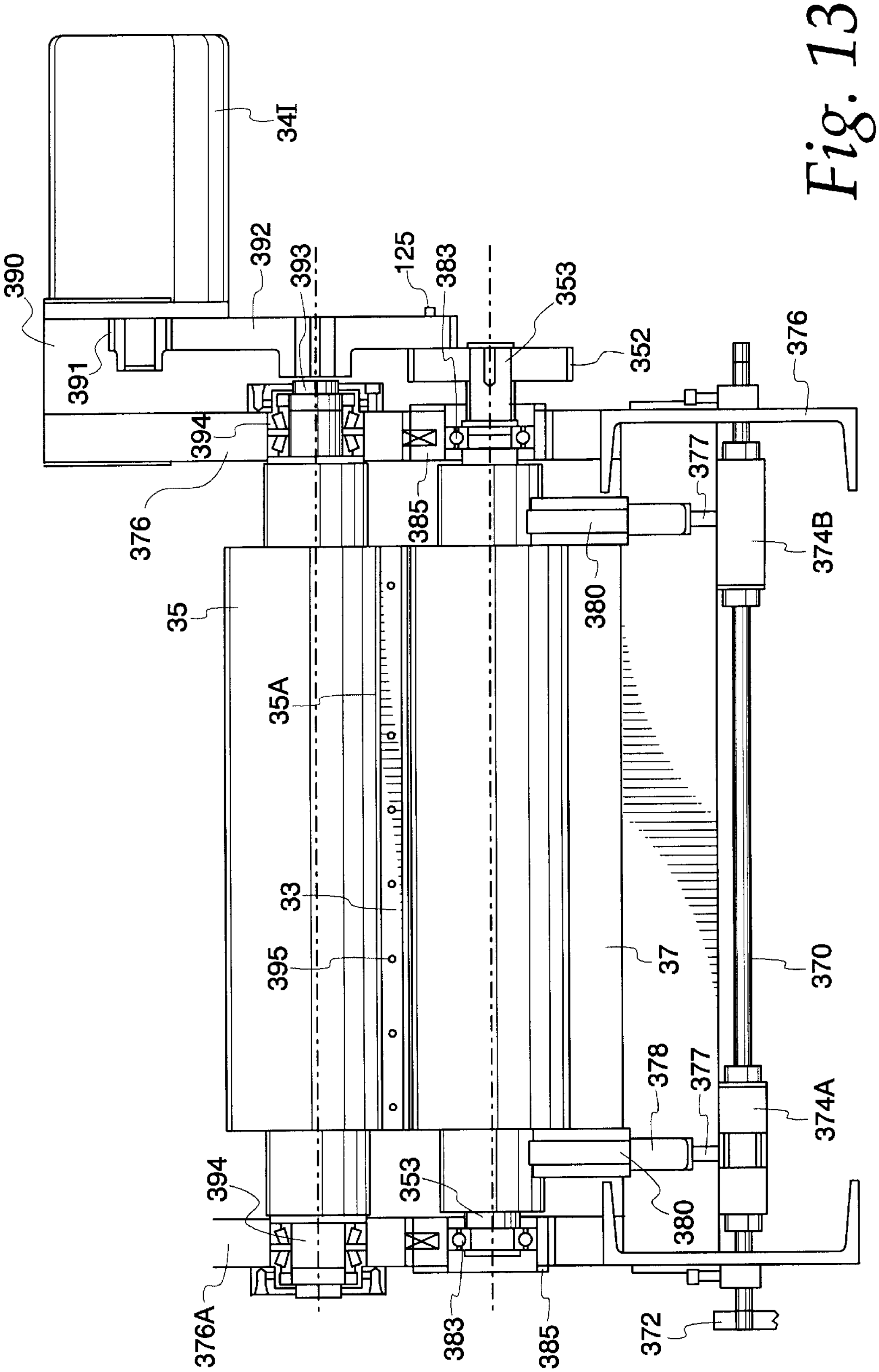
FIG. 13 is a front elevational view of the cut-off station and a mounting of the lower anvil roller to adjust its position vertically relative to the cut-off cylinder.

At the severing station 33, it is the lower anvil roller 37 that is vertically, adjustable relative to the upper cut-off cylinder 35. As best seen in FIGS. 13 and 14, the height of the anvil roller is adjusted by turning either one of two handwheels 372, one of which is fastened to a lefthand, worm gear shaft 370 to raise the anvil cylinder 37; and the other handwheel is fixed to the righthand, worm gear shaft 371 to lower the anvil roller 37 relative to the cut-off cylinder 35. Each of these worm gear shafts is turned by a handwheel 372 fixed to a respective shaft, and these shafts extend between the stationary side frame members 376 and 376A of the machine. Each of the shafts has a worm gear 373*a* and 373 (FIG. 14) respectively thereon in each of a pair of worm gear units 374*a* and 374*b*. The worm gears 373*a* and 373*b* are meshed with a central gear 375 on vertical shaft 377 in the worm gear units to turn its central vertical shaft 377 that is threaded into a threaded nut portion 378 in a roller support 380. The latter carries, at each of its opposite ends, a pair of rotatable support bearing rollers 381 (FIG. 14) with the lower portion of the anvil roller 37 being cradled therein and supported for rotation. The shaft 353 for the anvil roller 37 are is mounted in bearings 383 carried in slide blocks 385 which slide in vertical ways 386 (FIG. 14) in the side frame members 376 and 376A. Thus, the spacing of the anvil roller, relative to the rotating knife blade 33 for cutting, may be readily adjusted to assure a good, clean, severing cut of the web to form sheets with proper edges for various thicknesses of web. Often, the adjustment is done while the machine is operating to produce the proper clean cut edges 10*a* and 10*b* for the sheets.

As best seen in FIG. 13, the variable speed motor 34I for rotating the cut-off cylinder 35 is mounted in a horizontal position by a bracket 390 attached to the machine side frame with its motor pinion gear 391 meshed with a gear 392 fixed to cut-off cylinder shaft 393. Bearings 394 mount the shaft for rotation in the opposite, stationary side frame members 376 and 376*a*. The knife blade 33 is a straight steel blade that is held in a notch 35A in the cylinder by set screws 395. As above described, in connection with FIGS. 2 and 4B, the gear 391 may carry the position mark 125 rather than the severing cylinder 35 to be sensed by the position sensor 60. The cylinder position signal is sent over line 29 to the sheet controller 59. The sensing of the reference marks 52 by the web sensor 50 are sent over line 54 to the sheet controller 59, which has a keypad 409I. The operation of the sheet controller is timed, as above described, for the controllers for the glue station and chip station to assure that the sheet is severed to the proper length and relative to any printed matter and swatches on the sheet.

Figure 3:
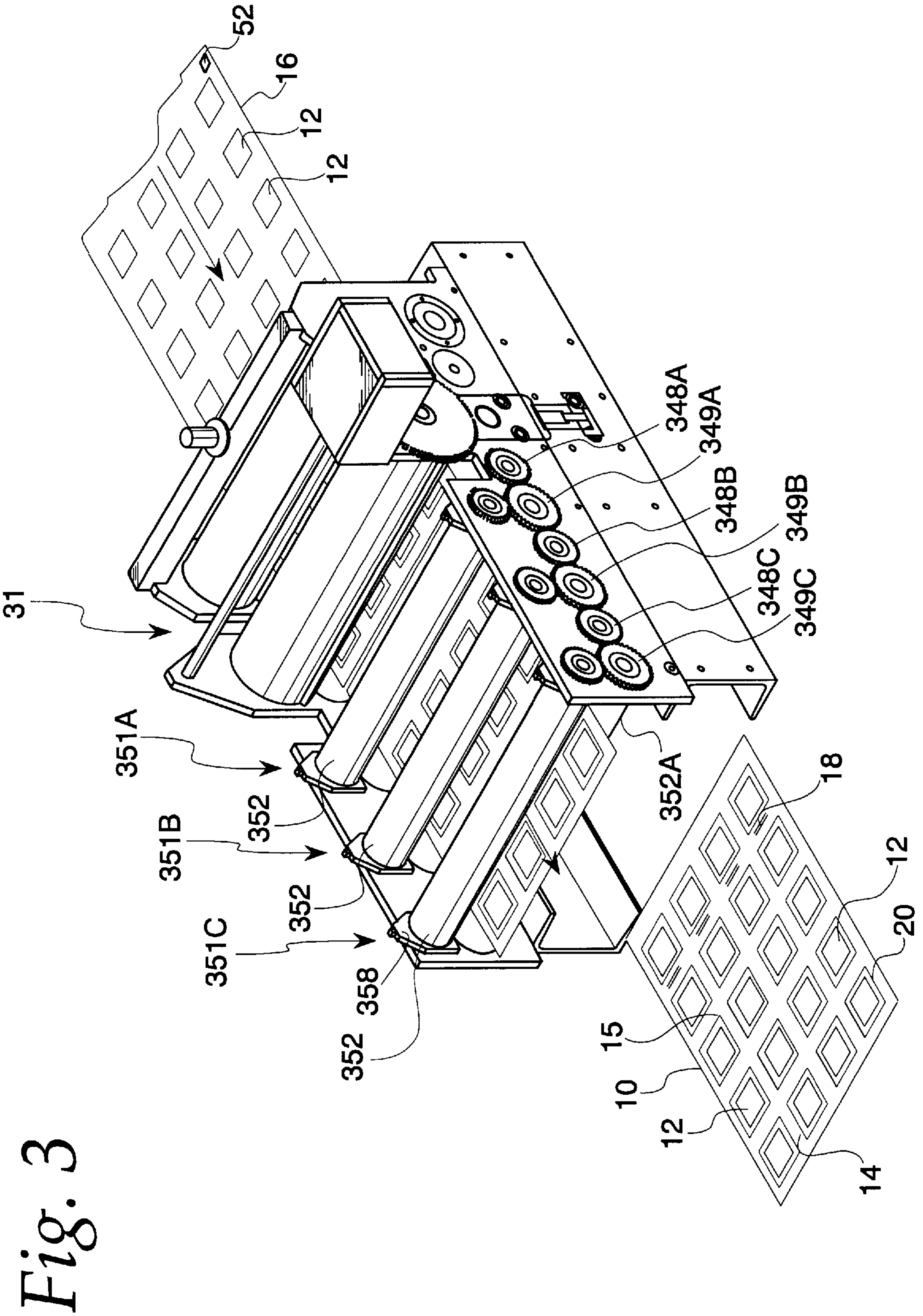
FIG. 3 is a perspective view of a cut-off station for cutting the web into sheets of presser rolls for pressing the swatches to the sheet.

As best seen in FIGS. 3 and 9, the line feed drive for the lower line feed roller 65 drives the lower anvil roller 37 and drives upper and lower press rollers 352 and 352*a*. The gear drive from the anvil roller gear 352 includes three idler gears 348*a*, 348*b* and 348*c* which drive adjacent gears 349*a*, 349*b* and 349*c*, each of the latter being mounted on and fixed to a lower press down roller 352*a*. Thus, just after a sheet 10 is cut from the web 32 at the severing station, the cut sheet passes through the nips of three sets of press down roller sets 351*a*, 351*b* and 351*c*, which press the swatches tightly against the adhesive and sheet 10 to assure the swatches adhere tightly to the sheet. Upper press down rollers 352 in each roller set 351*a*, 351*b* and 351*c* are mounted in vertical slides 353 to be shifted vertically in slides to adjust the nip for the thickness of sheet and swatches being pressed between the upper and lower press rollers 352 and 352*a*.

After leaving the press down roller sets 351*a*, 351*b* and 351*c*, the sheets are fed into a slitter (not shown) that shears the edge of the sheet bearing the registration mark 52. If so desired, a folder may be provided after the slitter to fold the sheets.

Setting the controllers, such as controllers 56–59, involves writing into their respective memories parameters defining the operational cycle of each servo system along the web. The memories of the controllers and PLC completely describe the control process for a given job. At the conclusion of a job and before a next job is begun, the computer polls each controller over the RS422 serial bus 401 and reads each stored parameter into the memory of computer 407. Should the same job be needed in the future, the parameters stored in computer 407 can be loaded into appropriate register of the various controllers over the bus 401.

Figure 15:
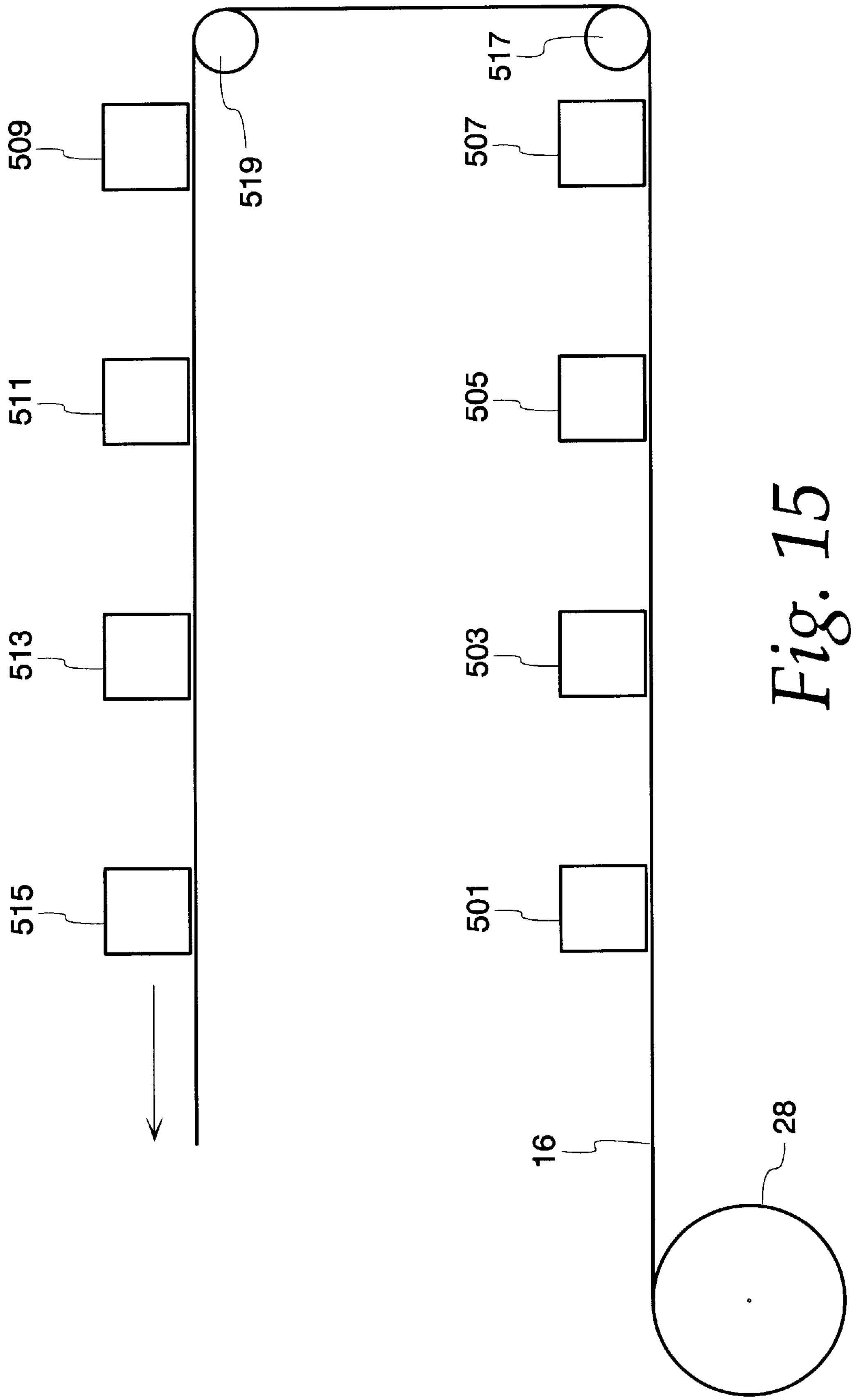
FIG. 15 is a diagrammatic view of an apparatus for applying swatches on one side of the web as it travels to the right, and for reversing the direction of travel of the web and applying swatches to the other side of the web.

In FIGS. 1 and 2, the web is shown extending from roll 28 to cut sheets in a substantially linear manner. Such is not required, and advantages can be achieved by departing from such a linear web. FIG. 15 represents a swatch placement apparatus for placing swatches on both sides of a continuous web 16. In FIG. 15, the individual drum controlling units, such as pull rolls, sheeters, gluers and chip placers, are represented by rectangles placed above a moving web. The pull rolls 513 provide the movement of the web 16, as in the preceding discussion. The web, however, is unrolled from roll 28 run through, for example, gluer 501 and chip placers 503, 505 and 507, then the direction is changed by a pair of free wheeling rollers 517 and 519. This change of direction exposes the previous underside of the web to a second gluer 509 and chip placer 511. Lastly, the web is cut into sheets by sheeter 515.

With the embodiment of FIG. 15, chips can be applied to both sides of a web. In keeping with the description of the single side placement control architecture, the web includes a repeating reference mark on both sides of the web so that proper control and phasing can be exercised. Each station, e.g. 501, will still receive web speed information from the pull rollers, e.g. 513, and operate in a servo loop of the disclosed type to properly complete this chip placement process.

As will be apparent from the above description, the gluer unit, each chip placer unit, and the severing unit are each modular units that are electronically connected; and each unit has its own variable speed, servo drive motor. Thus, one can add, replace, or subtract modular units (such as a chip unit) to provide a system that can be increased in size and length, or conversely decreased in the number of stations by adding or replacing a modular unit.

It is also possible to add a die cut unit to die cut the swatches into shapes other than rectangular. For example, if one desires round or oval-shaped swatches 12, one can apply round or oval-shaped, adhesive spots 22 to the web 16 at the gluing station 24; and, after applying the rectangular swatches to these glue spots at the swatch-applying stations 30, the web can be fed through a modular die cut cylinder having circular or oval dies that will sever the outer portion of the rectangular swatches leaving only the circular or oval swatches on the web that are the same size as the glue spots. Then, the webs may be cut into sheets at a severing station 33.

What is claimed is:

1. A method of manufacture of swatch-bearing sheets from a web preprinted with a repeat pattern with the swatches precisely positioned relative to the repeat pattern using rotating cylinders having a circumferential length substantially different than a sheet length; said method comprising the steps of:

applying adhesive spots at an adhesive-applying station to a continuously traveling web at precise positions on the web to receive and to adhere swatches to the web at these positions;

continuously traveling the preprinted web at a substantially constant velocity through a first swatch-applying station having a rotating swatch-applying cylinder for applying first swatches to the first adhesive spots on the traveling web;

sensing a preprinted reference mark on the traveling web to locate the position of the repeat pattern traveling relative to the rotating cylinder;

matching the rotational velocity of the swatch-applying cylinder to the velocity of the traveling web at the time of application of the first swatches to the first adhesive spots on the web during a speed match portion of a revolution of the swatch-applying cylinder;

changing the rotational velocity of the swatch-applying cylinder after swatch application and during a sync recovery portion of the cylinder's revolution to provide a revolution profile matched to the repeat length of the sheets to be severed from the web;

shifting the phase of the speed match portion of the cylinder's revolution based on the location of the sensed preprinted reference mark to position and to adhere the first swatches precisely relative to the repeat pattern on the web;

continuously traveling the preprinted web having second adhesive spots thereon through the first swatch-applying station to a second swatch-applying station having a rotating swatch-applying cylinder for applying second swatches to the second adhesive spots on the web traveling through the second swatch-applying station; and severing the web at repeat distances into a plurality of sheets each having an identical pattern of first and second swatches precisely positioned on each sheet relative to the preprinted repeat pattern.

2. A method in accordance with claim 1 wherein the applying of adhesive spots to the web comprises:

rolling contact from an adhesive cylinder at the adhesive-applying station to apply wet adhesive spots to the continuously traveling web at precise positions relative to the preprinted repeat pattern on the web.

3. A method in accordance with claim 2 including the steps of:

matching the rotational velocity of the adhesive-applying cylinder and the velocity of the traveling web at the time of adhesive application during a speed match portion of a revolution of the adhesive cylinder; and changing the rotational velocity during a sync recovery portion of the revolution of adhesive cylinder to provide a profile matched to the repeat length for the sheets.

4. A method in accordance with claim 3 including the step of shifting the phase of the speed match portion of the adhesive-applying cylinder's revolution based on the location of the sensed preprinted reference mark.

5. A method in accordance with claim 3 including the steps of:

applying the adhesive in a predetermined pattern from the surface of the rotating adhesive-applying cylinder;

providing the adhesive cylinder with a circumference greater than the repeat length of sheets; and changing the velocity of the adhesive cylinder during the sync recovery portion of the revolution by increasing its velocity to be greater than the velocity of the traveling web; and decreasing the velocity at the time of adhesive application to match the web velocity.

6. A method in accordance with claim 1 wherein each of the swatch cylinders has a circumference that is substantially larger than the sheet repeat length; and including the step of increasing the velocity of each swatch cylinder above the traveling web velocity during the sync recovery portion of each revolution of each swatch cylinder; and sensing the reference mark at each swatch-applying station and changing the position of the matching velocity, speed match portion during a revolution based on the location of the sensed reference mark.

7. A method in accordance with claim 1 including the steps of:

sensing the reference marks at a severing station; and severing the web at precise locations determined by the reference marks to provide each sheet with the repetitive patterns at precise distances from cut edges for each sheet.

8. A method in accordance with claim 7 including the steps of:

severing the web with a rotating knife traveling about a circumferential path substantially different in distance from the repeat distances;

varying the speed of rotation of the rotating knife during each rotation; and substantially matching the velocity of the rotating knife to the web's velocity at the time of severing the web so as not to tear the web when severing the web.

9. A method in accordance with claim 8 including the steps of:

rotating an anvil roller for cooperation with the rotating knife to sever the web; and moving a rotational axis for the anvil roller to change its position relative to a rotational axis for the rotating knife to adjust for differences in thickness of the web and/or swatches on the web.

10. A method in accordance with claim 1 including the steps of:

varying the repeat length of sheets from one job to the next job while keeping the same swatch-applying cylinders; and changing the lengths of the respective first and sync recovery portions of a revolution to provide a different length of time of swatch application to the traveling web from one job to the next job.

11. A method in accordance with claim 1 including the steps of:

pressing the swatches to the web with opposed pressure rollers; and varying a nip distance between the opposed pressure rollers to accommodate different thicknesses of swatches and web from one job to another job.

12. A method in accordance with claim 1 including the steps of:

unwinding the web from a roll;

exerting a pulling force on the web with line feed rollers to pull the web from the roll and to pull the web through the plurality of swatch-applying stations; and measuring the tension in the traveling web stream of the line feed rollers.

13. A method in accordance with claim 1 including the steps of:

applying the swatches to one side of the web when traveling in a first travel direction;

reversing the travel direction of the web from the first travel direction; and applying swatches to an opposite side of the web to produce sheets having swatches on both sides of the sheets.

14. A method in accordance with claim 1 including the steps of:

for a given job, storing in a memory the web velocity, profiling data for the respective swatch-applying cylinders for the same repeat sheet length, and the pattern of swatches; and using this stored data to set up the apparatus for a subsequent run of the same job.

15. A method in accordance with claim 1 including the steps of:

sensing reference marks on the traveling web at an adhesive-applying station;

changing the angular phase position of an adhesive-applying cylinder as to when it applies adhesive to the traveling web;

matching the velocity of the adhesive-applying cylinder and the traveling web velocity at the time of adhesive application to the web;

sensing the reference marks at a severing station;

changing the angular phase of a rotating, severing roller having a knife blade to phase shift the location of the severing to a specific position based on the sensed reference marks; and substantially matching the velocity of the rotating knife to the velocity of the traveling web at the time of severing the traveling web into sheets.

16. A method of finely adjusting the location of adhesive spots and swatches relative to preprinted material on a traveling web which is to be severed into sheets; said method comprising the steps of:

applying swatches with a rotating cylinder at each of a plurality of swatch-applying stations to a web traveling at a constant speed through a plurality swatch-applying stations with the each cylinder's velocity matched to the web's velocity during a speed match portion of a respective cylinder's revolution;

changing each of the cylinder's velocity substantially during a sync recovery portion of the cylinder's revolution to provide a profile matched to the web's velocity; and sensing reference marks on the traveling web and changing an angular phase positions of the respective rotating cylinders of the swatch applications based on the sensed locations of the reference marks to register the swatches to the preprinted sheets the respective swatch-applying stations; and providing the operator with a manual control to manually shift the phase position of the respective cylinders to more precisely register the swatches to the preprinted material.

17. A method of manufacturing from a web, a plurality of sheets bearing colored chips adhered to the sheets at precise positions on the sheets, the method comprising the steps of:

unwinding a preprinted web at an unwinding station having a tension device to provide a substantially constant tension force on the unwound web and feeding the web forwardly at a substantially constant velocity;

applying rows of adhesive spots to the traveling web from a rotating cylinder having a circumference substantially different than that of a repeat distance and matching the velocity of the cylinder to the web velocity during the application of the adhesive spots to the traveling web during a speed match portion of the cylinder's revolution, then changing the velocity of the cylinder's rotational movement substantially through a remainder portion of the cylinder's revolution;

cutting colored ribbons into colored chips at a plurality of chip-applying stations and transferring the severed chips by each of the chip cylinders to a row of aligned adhesive spots on the continuously traveling web with each chip cylinder having a velocity matched to the web velocity during the transfer of the chips and their adhesion to the adhesive spots during a speed match portion of the chip cylinder's revolution, then changing the velocity of the chip cylinder substantially during a sync recovery portion of its revolution; and severing the web at repeat distances into a plurality of sheets each having an identical pattern of colored chips precisely positioned on each sheet.

18. A method of forming and applying swatches to a web and to sever the web into sheets each having swatches precisely positioned on the sheet; said method comprising the steps of:

moving a web to travel at a substantially constant speed of travel;

rotating an adhesive-applying roller having adhesive applicators thereon at a velocity matched to the constant web travel speed to apply an adhesive pattern to the web for a speed match portion of a revolution of the adhesive-applying roller and changing the velocity for another portion of the revolution to provide a profiled adhesive application of adhesive to the web;

rotating at least one swatch-applying cylinder at a velocity matched to the web velocity during a speed match portion of the swatch cylinder's revolution and adhering the swatches to the adhesive by rolling contact;

changing the velocity for another portion of the revolution of the swatch-applying cylinder to provide a profiled, repeat application of swatches to the web; and rotating a cutting blade at a velocity substantially matched to the web travel velocity at the time of severing and changing the velocity of the cutting blade over another portion of a revolution of the cutting blade to provide a profiled travel of the cutting blade for severing the web into sheets each having a predetermined repeat length.

19. A method in accordance with claim 18 including the step of:

sensing printed reference marks on the traveling web; and changing the angular position of the beginning or stopping of the adhesive application, swatch application, and severing based on the position of the sensed reference marks.

20. A method in accordance with claim 19 including the step of:

sensing the printed reference marks at each of the adhesive, swatch and severing stations and changing the respective rotational positions of each of these respective adhesive, application, swatch application, and severing operations during the speed match portion of a revolution based on the sensed referenced signals.

21. An apparatus for applying adhesive and swatches to a traveling web, the apparatus comprising:

an adhesive-applying cylinder at an adhesive station for applying adhesive by rolling contact with the traveling web at predetermined and precise locations on the traveling web during each revolution of the adhesive-applying cylinder;

a variable speed motor connected to and driving the adhesive-applying cylinder to rotate this cylinder to a circumferential speed match velocity matched to the web's velocity at the time of rolling contact with the traveling web, during a speed match portion of its revolution; and to change to a substantially different sync recovery velocity during a sync recovery portion of its revolution to provide a velocity profile for each revolution of the adhesive-applying cylinder;

a swatch-applying cylinder at a swatch station for applying swatches to the adhesive on the traveling web by rolling contact during each revolution of the swatch-applying cylinder;

a variable speed motor driving the swatch-applying cylinder at the circumferential, speed match velocity during the speed match portion of the cylinder's revolution, and to change substantially different sync recovery velocity during a sync recovery portion of its revolution to provide a velocity profile for each revolution of the adhesive-applying cylinder; and a controller to operate the respective variable speed motors at their respective profiles.

22. An apparatus in accordance with claim 21 wherein a rotating knife blade has a profile with a speed match velocity matched to the web's velocity at the time of cutting the web into sheets, and with a sync recovery velocity during a sync recovery portion of the revolution.

23. An apparatus in accordance with claim 21 wherein a sensor senses reference marks on a preprinted web and is connected to the controller to cause the controller to shift the phase of the swatch-applying roller to shift the beginning or ending of the rolling contact between the swatches and the web.

24. An apparatus in accordance with claim 23 wherein a sensor associated with the adhesive station senses the reference marks on the web and adjusts the phase of the adhesive cylinder to position the adhesive precisely relative to the reference mark and to printed matter on the traveling web.

25. An apparatus in accordance with claim 21 wherein a sensor is associated with the rotating knife blade for sensing a printed reference mark on the traveling web, and the sensor is connected to the controller to adjust the phase of the rotating blade to sever the web precisely relative to printed matter on the traveling web and to the swatches adhered to the traveling web.

26. An apparatus in accordance with claim 21 wherein:

a plurality of additional swatch-applying cylinders and swatch-applying stations are provided to sequentially apply rows of swatches to the traveling web; and a sensor at each of the swatch-applying stations senses the position of printed reference marks printed on the web in a repeat pattern, and the controller adjusts each swatch-applying cylinder at each station to precisely position each row on the traveling web relative to a given reference mark on the web.

27. An apparatus in accordance with claim 21 wherein:

a plurality of swatch-forming cylinders and a knife are provided at each of a plurality of swatch-applying stations to sever a plurality of swatch ribbons into discrete swatches;

a rotating, severing cylinder having a severing knife severs the traveling webs into sheets at a web-severing station;

line feed rollers pull the web to travel through the respective adhesive, swatch-applying, and severing stations at a substantially constant velocity; and a sensor at the respective adhesive, swatch-applying and severing stations is connected to the controller to adjust the phase of the respective adhesive, swatch-applying and severing cylinders relative to the reference marks as they are at each of these respective stations.

28. An apparatus for forming and laying a plurality of swatches at specific locations on a sheet web traveling at a velocity to be cut into sheets of a predetermined repeat length, said apparatus comprising:

a supply of swatch ribbons material for traveling to a severing station;

a feed roller for feeding the ribbons to the severing station;

a rotating, swatch-forming cylinder at the severing station for receiving the ribbons and carrying the ribbons to a rotating knife to sever simultaneously a swatch from each ribbon;

a rotatable transfer cylinder for transferring the plurality of cut swatches by rolling contact to the traveling web;

a variable speed motor connected to the swatch-forming cylinder and to the transfer cylinder to provide a profile of rotating velocities to these respective cylinders during each revolution thereof including a first speed match velocity of the profile matching the web's velocity at the time of rolling transfer of the swatches to the traveling web and a second different sync recovery velocity during each revolution to provide a revolution profile matched to the repeat length of the sheets to be severed from the sheet web; and a controller connected to the variable speed motor to control the profile of the respective velocities during each revolution of the transfer cylinders.

29. An apparatus in accordance with claim 28 including a sensor for sensing reference marks on the traveling web; and an electrical circuit between the sensor and the controller to input the position of the reference mark to the controller to cause the controller to change the profile and to position the swatches on the web precisely relative to the reference marks.

30. An apparatus in accordance with claim 28 wherein the controller changes the beginning and ending of the matching velocity with a change in length of the swatches being applied.

31. An apparatus in accordance with claim 28 wherein the web is preprinted, and the reference mark is printed on the web; and the sensor is an optical sensor for sensing the mark to operate the controller to precisely position the swatches relative to printed matter on the traveling web.

32. An apparatus in accordance with claim 28 wherein a manual operator control is connected to the controller and is operable by the operator to change the position of the swatch-applying slightly to allow the operator to adjust the position of the swatches relative to the printed matter on the traveling web.

33. An apparatus in accordance with claim 28 wherein the controller comprises a computer; and a storage capacity is provided with the computer to store the parameters of the profile and of the phase for swatches being applied to a given preprinted web so that the same job may run again with the computer adjusting the apparatus to the stored parameters for a subsequent running of the job.

* * * * *